US012640581B2

(12) United States Patent
Kim

(10) Patent No.: US 12,640,581 B2
(45) Date of Patent: May 26, 2026

(54) METHOD OF PROVIDING POWER THROUGH BYPASS PATH AND ELECTRONIC DEVICE TO WHICH SAME IS APPLIED

(71) Applicant: Samsung Electronics Co., Ltd., Gyeonggi-do (KR)

(72) Inventor: Kyoungwon Kim, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 960 days.

(21) Appl. No.: 17/733,382

(22) Filed: Apr. 29, 2022

(65) Prior Publication Data

US 2023/0051908 A1    Feb. 16, 2023

Related U.S. Application Data

(63) Continuation of application No. PCT/KR2022/005868, filed on Apr. 25, 2022.

(30) Foreign Application Priority Data

Aug. 3, 2021    (KR) ........................ 10-2021-0102126

(51) Int. Cl.
*H02J 7/00* (2026.01)
*G06F 13/42* (2006.01)
(Continued)

(52) U.S. Cl.
CPC ............ *H02J 7/96* (2026.01); *G06F 13/4282* (2013.01); *H02J 7/342* (2020.01); *H02J 7/47* (2026.01);
(Continued)

(58) Field of Classification Search
CPC ............. H02J 7/007182; H02J 7/00045; H02J 7/0048; H02J 2207/20; H02J 7/00034; H02J 7/342; G06F 13/4282; G06F 2213/0042
See application file for complete search history.

(56) References Cited

U.S. PATENT DOCUMENTS 6,838,611 B2 *  1/2005  Kondo .................... H02J 3/381
                                                                    136/244
9,153,984 B2   10/2015  Ono et al.
(Continued)

FOREIGN PATENT DOCUMENTS

CN      110086327 A  *  8/2019  ............. H02M 1/00
JP      2012-79963 A      4/2012
(Continued)

OTHER PUBLICATIONS

International Search Report dated Aug. 12, 2022.

*Primary Examiner* — Julian D Huffman
*Assistant Examiner* — John P Ondrasik
(74) *Attorney, Agent, or Firm* — CANTOR COLBURN LLP

(57) ABSTRACT

According to an embodiment of the disclosure, an electronic device comprises: a battery, a memory, a connector including one or more signal terminals, a first converter included in a first path that connects the battery to the connector, a second converter included in second path that is distinct from the first path and connects the battery to the connector, and a processor electrically connected to the battery, the memory, the connector, the first converter, and the second converter, wherein the memory stores instructions that, when executed, cause the processor to obtain identification information of the external electronic device when the electronic device is connected to the external electronic device through the connector, determine whether the iden- (Continued)

tification information matches comparison data stored in the memory, determine whether a voltage of a power terminal (vbus) among the one or more signal terminals satisfies a specified condition when the identification information matches the comparison data, and transmit power determined based on a real-time voltage of the battery to the external electronic device by using the second path through the connector, based on whether the specified condition is satisfied.

20 Claims, 12 Drawing Sheets

(51) Int. Cl.

| | | |
|---|---|---|
| *H02J 7/34* | (2006.01) | |
| *H02J 7/47* | (2026.01) | |
| *H02J 7/82* | (2026.01) | |
| *H02J 7/96* | (2026.01) | |

(52) U.S. Cl.
CPC ........ *H02J 7/82* (2026.01); *G06F 2213/0042* (2013.01)

(56) References Cited

U.S. PATENT DOCUMENTS

| | | | | |
|---|---|---|---|---|
| 9,203,254 | B2 | 12/2015 | Balmefrezol et al. | |
| 9,927,759 | B2 | 3/2018 | Kasamatsu et al. | |
| 9,948,124 | B2 | 4/2018 | Haberland | |
| 9,996,130 | B2 | 6/2018 | Rhee | |
| 9,997,940 | B2 * | 6/2018 | Xu ........................... | H02J 7/342 |
| 10,707,690 | B2 | 7/2020 | Jung et al. | |
| 2005/0240786 | A1 * | 10/2005 | Ranganathan ....... | G09G 3/3208 |
| | | | | 713/320 |
| 2007/0216363 | A1 * | 9/2007 | Kawamoto ............. | G06F 1/263 |
| | | | | 320/132 |
| 2008/0054855 | A1 * | 3/2008 | Hussain ................ | H02J 7/0068 |
| | | | | 320/162 |
| 2009/0204738 | A1 * | 8/2009 | Schubert ................ | H01R 27/00 |
| | | | | 710/105 |
| 2011/0057636 | A1 * | 3/2011 | Su .......................... | H02M 3/156 |
| | | | | 323/285 |
| 2015/0008749 | A1 | 1/2015 | Rhee | |
| 2015/0311729 | A1 | 10/2015 | Ono et al. | |
| 2016/0064979 | A1 * | 3/2016 | Huang .................. | H02J 7/0071 |
| | | | | 320/114 |
| 2016/0141822 | A1 * | 5/2016 | Hijazi ................ | H01R 13/6595 |
| | | | | 29/842 |
| 2016/0197637 | A1 * | 7/2016 | Lee ........................... | G06F 3/14 |
| | | | | 455/566 |
| 2017/0133862 | A1 * | 5/2017 | Jung ...................... | H01M 10/46 |
| 2018/0024899 | A1 * | 1/2018 | Degura .............. | G06F 11/2247 |
| | | | | 358/520 |
| 2019/0041935 | A1 | 2/2019 | Hijazi et al. | |
| 2019/0131810 | A1 * | 5/2019 | Lim ........................ | H02J 7/342 |
| 2021/0089099 | A1 * | 3/2021 | Lee ........................... | G06F 1/266 |
| 2022/0147130 | A1 | 5/2022 | Kim | |

FOREIGN PATENT DOCUMENTS

| | | | |
|---|---|---|---|
| JP | 2014-530590 | A | 11/2014 |
| KR | 10-2014-0113892 | A | 9/2014 |
| KR | 10-2015-0005030 | A | 1/2015 |
| KR | 10-2015-0112717 | A | 10/2015 |
| KR | 20-2016-0004090 | U | 11/2016 |
| KR | 10-2021-0012766 | A | 2/2021 |
| WO | 2012/025231 | A | 3/2012 |

* cited by examiner

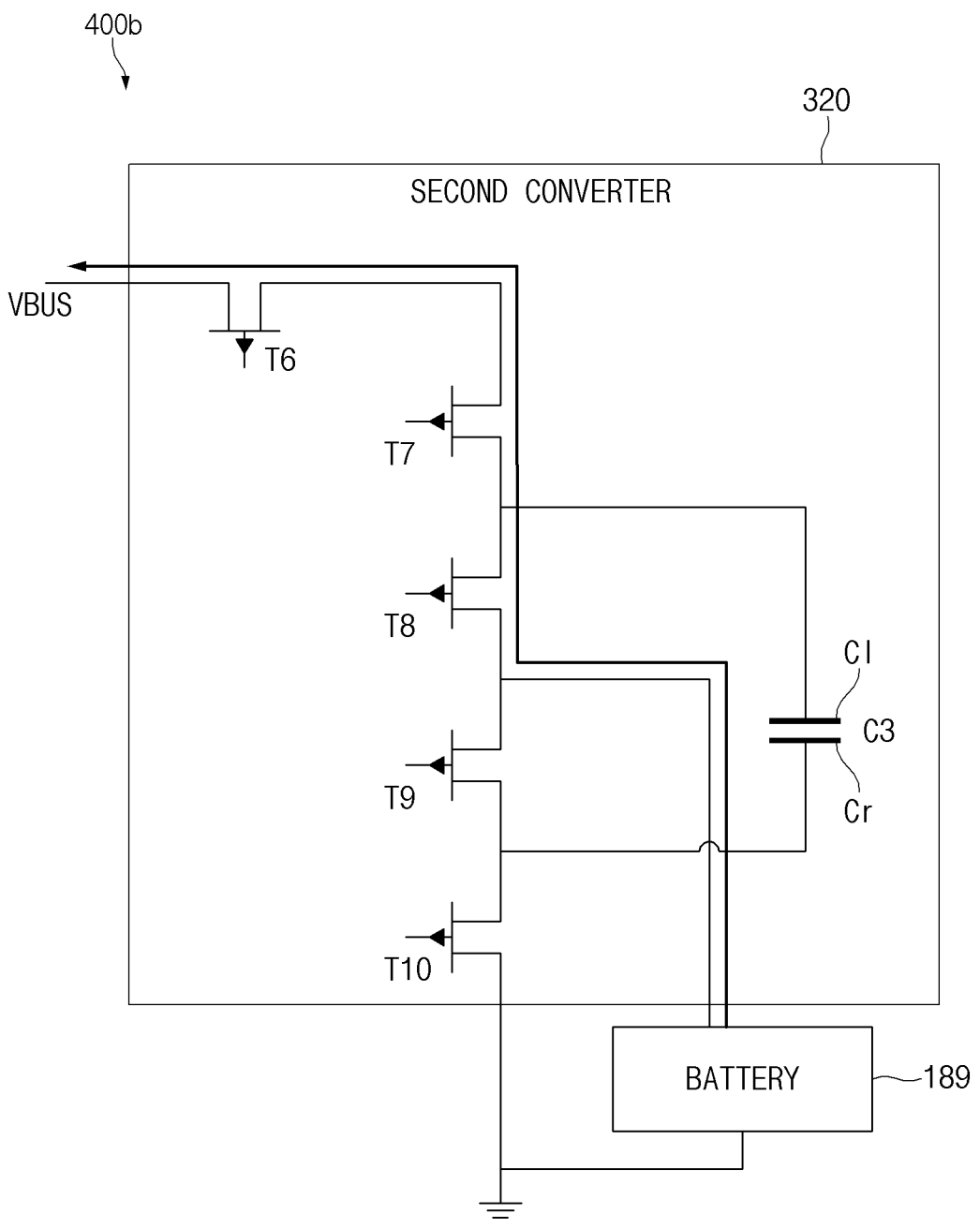
F I G . 4B

500b

| | PIN No. | Signal Name | NOTE |
|---|---|---|---|
| 511a,511b | 1 | GND | GROUND |
| 512a,512b | 2 | TX+ | Super speed TX positive |
| 513a,513b | 3 | TX- | Super speed TX negative |
| 514a,514b | 4 | V$_{BUS}$ | POWER TERMINAL |
| 515a,515b | 5 | CC | IDENTIFICAION TERMINAL |
| 516a,516b | 6 | Dp | + line of the differential bi-directional USB signal |
| 517a,517b | 7 | Dn | − line of the differential bi-directional USB signal |
| 518a,518b | 8 | SBU | Side Band Use:additional purpose pin (ex:Audio signal, display signal, ETC.) |
| 519a,519b | 9 | V$_{BUS}$ | POWER TERMINAL |
| 520a,520b | 10 | RX- | Super speed RX negative |
| 521a,521b | 11 | RX+ | Super speed RX positive |
| 522a,522b | 12 | GND | GROUND |

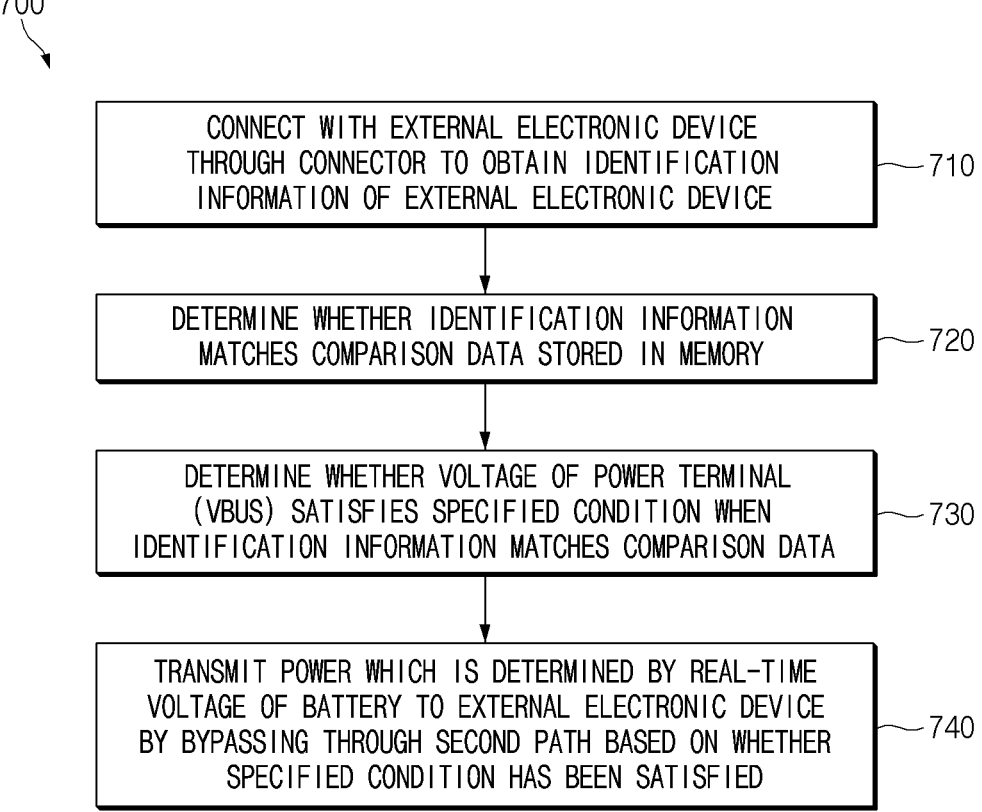

CONNECT WITH EXTERNAL ELECTRONIC DEVICE
THROUGH CONNECTOR TO OBTAIN IDENTIFICATION
INFORMATION OF EXTERNAL ELECTRONIC DEVICE ~710

DETERMINE WHETHER IDENTIFICATION INFORMATION
MATCHES COMPARISON DATA STORED IN MEMORY ~720

DETERMINE WHETHER VOLTAGE OF POWER TERMINAL
(VBUS) SATISFIES SPECIFIED CONDITION WHEN
IDENTIFICATION INFORMATION MATCHES COMPARISON DATA ~730

TRANSMIT POWER WHICH IS DETERMINED BY REAL-TIME
VOLTAGE OF BATTERY TO EXTERNAL ELECTRONIC DEVICE
BY BYPASSING THROUGH SECOND PATH BASED ON WHETHER
SPECIFIED CONDITION HAS BEEN SATISFIED ~740

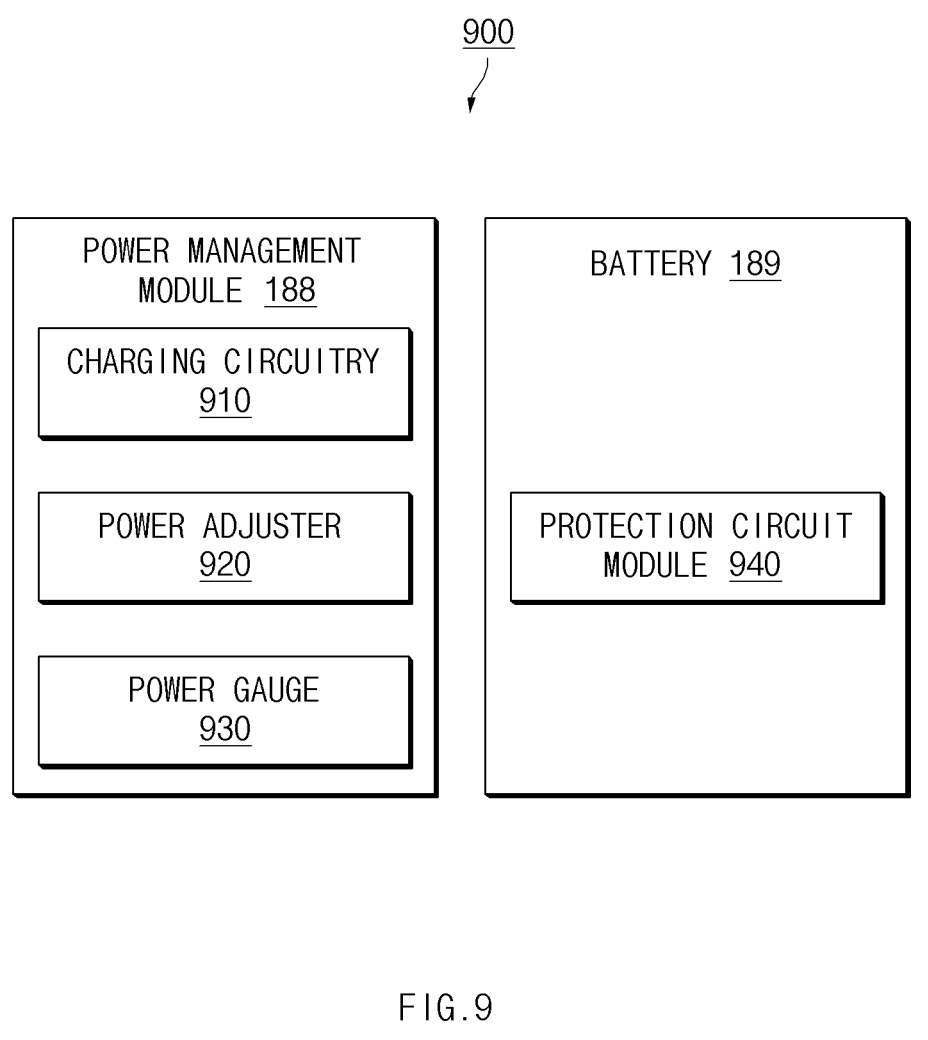

POWER MANAGEMENT
MODULE 188

CHARGING CIRCUITRY
910

POWER ADJUSTER
920

POWER GAUGE
930

BATTERY 189

PROTECTION CIRCUIT
MODULE 940

FIG.9

METHOD OF PROVIDING POWER THROUGH BYPASS PATH AND ELECTRONIC DEVICE TO WHICH SAME IS APPLIED

CROSS-REFERENCE TO RELATED APPLICATION(S)

This application is a continuation of International Application No. PCT/KR2022-005868 filed On Apr. 25, 2022, which claims priority to Korean Patent Application No. 10-2021-0102126, filed on Aug. 3, 2021 in the Korean Intellectual Property Office, the disclosures of which are herein incorporated by reference.

BACKGROUND

Technical Field

Various embodiments disclosed in the disclosure relate to a method of providing power through a bypass path and an electronic device to which the same is applied.

Background Art

Recently, the use of easily portable electronic devices such as smart phones, tablet PCs, or wearable devices has increased, and the electronic devices may be configured to perform various functions. For example, various functions such as voice communication, Internet search, photographing or video recording, playing music, or watching a video may be performed by the electronic device.

The electronic device may be connected to various external electronic devices, and may receive data from or transmit data to an external electronic device. In addition, the electronic device may receive power from an external electronic device or may provide power to the external electronic device.

For example, the electronic device may be connected to a computer or a host device such as a charger to receive power from the host device, or may be configured to transmit/receive data while receiving power from the host device. In addition, the electronic device may be connected to an on the go (OTG) device such as an earphone to provide power to the OTG device or to transmit and receive data while providing power to the OTG device.

Technical Problem

An electronic device may be connected to an external electronic device through a connector. For example, the electronic device may be connected through a USB type-C connector which is a standard for connecting a universal serial bus (USB) host and an external electronic device.

The electronic device may be connected to a host device capable of providing power, but may also be connected to a USB OTG device such as an earphone that cannot provide power. For example, when the electronic device is connected to the USB OTG device through the connector, the electronic device may output the voltage obtained by boosting the voltage of the battery through the connector. When the electronic device operates as a source, because the voltage boosted to a fixed value regardless of the voltage state of the battery is supplied through one path (OTG path), the power consumption of the battery may be large and the performance of the battery may deteriorate.

According to various embodiments of the disclosure, when providing power to the USB OTG device, the electronic device may change the power transmitting path based on state information of the electronic device.

SUMMARY OF INVENTION

According to an embodiment of the disclosure, an electronic device comprises: a battery, a memory, a connector including one or more signal terminals, a first converter included in a first path that connects the battery to the connector, a second converter included in second path that is distinct from the first path and connects the battery to the connector, and a processor electrically connected to the battery, the memory, the connector, the first converter, and the second converter, wherein the memory stores instructions that, when executed, cause the processor to obtain identification information of the external electronic device when the electronic device is connected to the external electronic device through the connector, determine whether the identification information matches comparison data stored in the memory, determine whether a voltage of a power terminal (vbus) among the one or more signal terminals satisfies a specified condition when the identification information matches the comparison data, and transmit power determined based on a real-time voltage of the battery to the external electronic device by using the second path through the connector, based on whether the specified condition is satisfied.

According to another embodiment of the disclosure, a method of controlling a voltage of an electronic device includes obtaining identification information of an external electronic device through a connector, determining whether the identification information matches comparison data stored in the electronic device, determining whether a voltage of a power terminal of the electronic device satisfies a specified condition when the identification information matches the comparison data, and transmitting power determined based on a real-time voltage of the battery to the external electronic device by using a second path through the connector, wherein the second path is distinct from a first path, based on whether the specified condition is satisfied.

According to the various embodiments of the disclosure, power may be supplied to an external electronic device based on the real-time voltage of the battery included in the electronic device under a specified condition through a bypass path that is distinct from the OTG path for supplying the boosted voltage. In this case, power consumption of the battery may be reduced by supplying power without boosting the voltage of the battery.

According to the various embodiments of the disclosure, according to whether each of the driving current of the external electronic device, the charge state of the battery included in the electronic device, the consumption current of the processor included in the electronic device, or the voltage of the power terminal (Vbus) of the electronic device satisfies the specified condition, the electronic device may optionally supply power to an external electronic device through the OTG path or the bypass path. Accordingly, when the external electronic device can be driven even using the bypass path, the power consumption of the battery may be reduced by supplying the power through the bypass path instead of the OTG path.

According to the various embodiments of the disclosure, when the electronic device supplies power by boosting the voltage of the battery through the OTG path, the electronic device may reduce the power consumption of the battery by changing the level of the battery voltage to a plurality of levels according to the minimum voltage required to drive the external electronic device.

According to the various embodiments of the disclosure, when the electronic device supplies power through the OTG path or the bypass path, the current consumption of the electronic device may be reduced by changing the switching frequency of the digital block included in the electronic device.

According to the various embodiments of the disclosure, as the power of the battery is efficiently used, the duration of the battery may be improved, and the battery may be prevented from deteriorating, thereby increasing the user experience.

In addition, various effects that are directly or indirectly understood through the disclosure may be provided.

DESCRIPTION OF DRAWINGS

FIG. 4B is a circuit diagram of a second converter according to one embodiment.

FIG. 5B is a view illustrating the arrangement of pins respectively formed on first and second surfaces of a contact substrate 205 formed inside a connector.

FIG. 7 is a view illustrating an operation in which an electronic device supplies power to an external electronic device using a second path.

FIG. 9 is a block diagram of a power management module and a battery according to one embodiment.

With regard to description of drawings, the same or similar elements may be marked by the same or similar reference numerals.

DETAILED DESCRIPTION

It should be appreciated that various embodiments of the present disclosure and the terms used therein are not intended to limit the technological features set forth herein to particular embodiments and include various changes, equivalents, or replacements for a corresponding embodiment.

Figure 1:
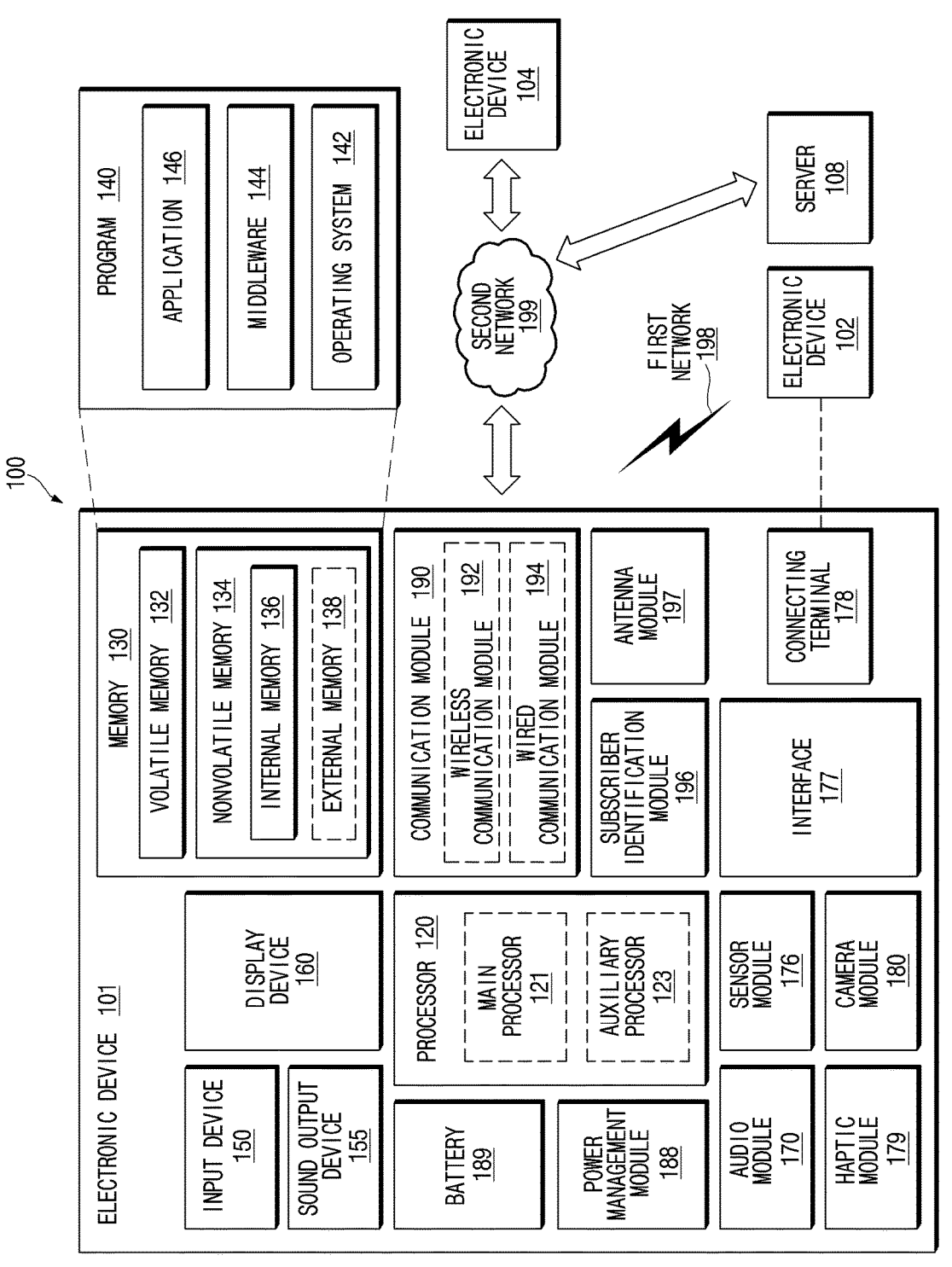
FIG. 1 is a block diagram illustrating an electronic device in a network environment according to one embodiment.

FIG. 1 is a block diagram illustrating an electronic device 101 in a network environment 100 according to one embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
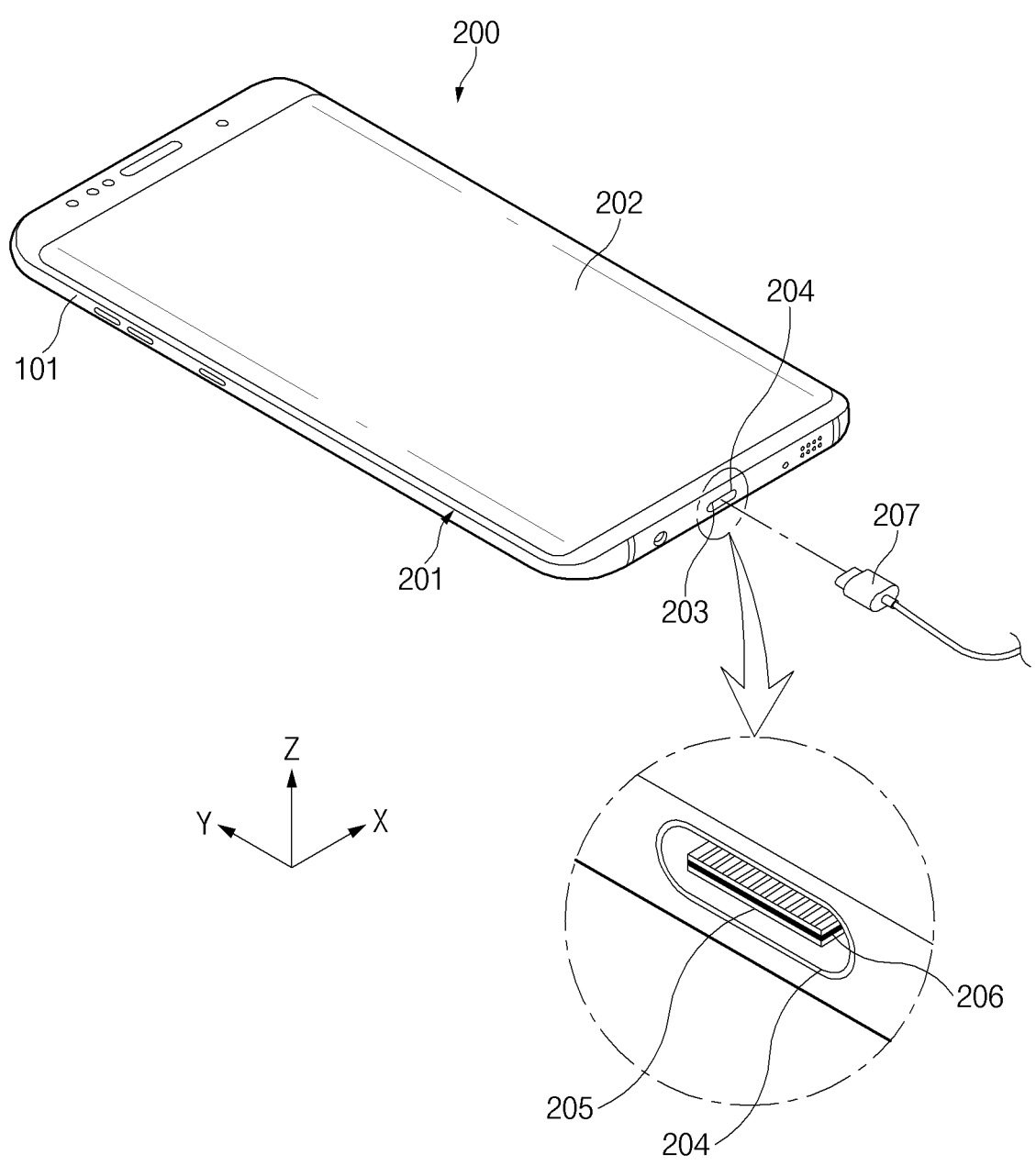
FIG. 2 is a perspective view of an electronic device according to one embodiment.

FIG. 2 is a perspective view 200 of an electronic device (e.g., the electronic device 101 of FIG. 1) according to one embodiment of the disclosure. Referring to FIG. 2, the 'x-axis' of the 3-axis Cartesian coordinate system may mean the width direction of the electronic device 101 or an external electronic device (e.g., the electronic device 102 of FIG. 1), the 'y-axis' may mean the longitudinal direction of the electronic device 101, and the 'z-axis' may mean the thickness direction of the electronic device 101.

The electronic device 101 may include a housing 201. The housing 201 may be formed of a conductive member and/or a non-conductive member. The electronic device 101 may include a display (e.g., the display module 160 of FIG. 1) arranged in such a manner that the display is exposed to at least a partial area of the housing 201 and capable of receiving a touch input of a user. For example, the display 160 may include a pressure sensor to operate as a pressure-responsive touch screen display. As another example, the display may operate as a capacitive touch screen display that detects a change in capacitance in response to a contact of an external object (e.g., a user's finger).

The electronic device 101 may include a connector 203 (e.g., the connecting terminal 178 of FIG. 1) that enables connection with the external electronic device 102. For example, the connector 203 may be a connecting terminal formed in a socket shape.

An opening 204 through which the connector 203 may be exposed may be formed in at least an area of the housing 201. The connector 203 may be arranged in the opening 204. An external connector 207 in the form of a header may be coupled to the connector 203. The external connector 207 may be coupled to the connector 203 in a plurality of directions. For example, a terminal in a first direction of the external connector 207 may be coupled to a terminal in the first direction of the connector 203. As another example, a terminal in a second direction of the external connector 207 may be coupled to a terminal in the first direction of the connector 203. The direction is only an example, and in the case of the connector 203 included in the opening 204 and formed in another shape, an additional direction may be presented.

The external connector 207 and connector 203 may each include a plurality of pins. The external connector 207 may use a plurality of pins to transmit/receive data and/or transmit/receive power regardless of a direction in which the external connector 207 is coupled to the connector 203. The external connector 207 may be connected to the external electronic device 102. As the connector 203 and the external connector 207 are coupled, the electronic device 101 and the external electronic device 102 may be connected to transmit/receive data and/or transmit/receive power.

For example, the electronic device 101 may transmit data of the electronic device 101 to the external electronic device 102 through the external connector 207 (connected to the connector 203), or receive data from the external electronic device 102. According to an embodiment, the electronic device 101 may receive power from a power source through the connector 203 or may provide power to the external electronic device 102. The external electronic device 102 may include various types of external electronic devices that can be connected to the electronic device 101 such as a TV, an audio device, a laptop computer, a computer, a charger, a memory, a fan, or an antenna.

The connector 203 may include several types of universal serial bus (USB). For example, the connector 203 may include USB Type-C. The USB Type-C is used by way of example, and not limitation. However, the connector 203 may include any types used as a USB standard. A contact substrate 205 may be formed inside the connector 203. According to an embodiment, a mid-plate 206 having electrically conductive properties may be formed inside the contact substrate 205, and a plurality of pins may be formed on the upper and lower surfaces of the contact substrate 205, respectively.

Figure 3:
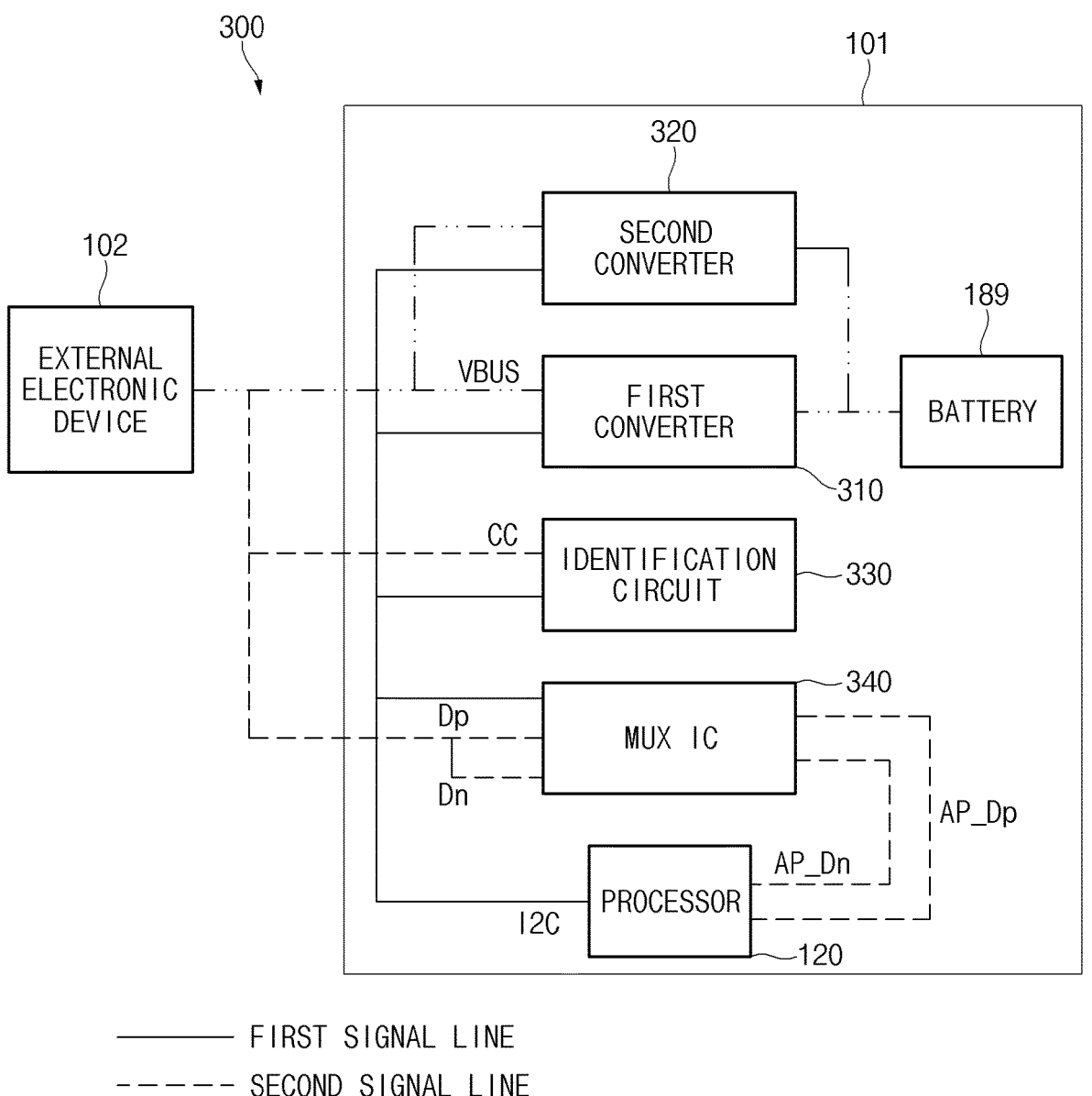
FIG. 3 is an internal block diagram of an electronic device connected to an external electronic device according to one embodiment.

FIG. 3 is an internal block diagram 300 of an electronic device (e.g., the electronic device 101 of FIG. 1) connected to the external electronic device 102 according to one embodiment of the disclosure.

Referring to FIG. 3, the electronic device 101 may operate in association with the external electronic device 102. The external electronic device 102 may include an accessory device that is functionally connected to the electronic device 101. For example, the external electronic device 102 may be an accessory device such as an earphone.

When the external electronic device 102 is connected, the processor 120 may determine a function of the electronic device 101 based on information recognized through a connector (e.g., the connector 203 of FIG. 2). The function of the electronic device 101 may include a function of providing power and/or a function of transmitting data.

For example, with respect to the function of providing power, the processor 120 may determine whether to operate the electronic device 101 either a device (e.g., a source device) for providing power to the external electronic device 102 or a device for receiving power from the external electronic device 102 (e.g., a sink device).

As another example, with respect to the function of transmitting data, the processor 120 may determine to operate the electronic device 101 as a host device or a downstream facing port (DFP) when the electronic device 101 transmits data. Alternatively, when the electronic device 101 receives data, the processor may determine to operate the electronic device 101 as a client device receiving data or an upstream facing port (UFP).

The electronic device 101 may include the processor 120, the battery 189, an identification circuit 330, a first converter 310, a second converter 320, and a MUX IC 340. The first converter 310 and/or the second converter 320 of the electronic device 101 may be included in a power management module (e.g., the power management module 188 of FIG. 1). Hereinafter, the power management module 188 may be commonly referred to as a PMIC 188. For example, the first converter 310 may be included inside the PMIC 188 and the second converter 320 may be disposed outside the PMIC 188. As another example, both the first converter 310 and the second converter 320 may be included inside the PMIC 188. As still another example, the first converter 310 may be arranged outside the PMIC 188, and the second converter 320 may be included inside the PMIC 188.

According to one embodiment, the first converter 310 and/or the second converter 320 may be implemented in a separate module form, and because the arrangement location may be variously implemented, the embodiment is not be limited to the above description. According to embodiments of the disclosure, any form in which an input terminal of each of the first converter 310 and/or the second converter 320 is electrically connected to the battery 189 of the electronic device 101, and an output terminal of each of the first converter 310 and/or the second converter 320 is electrically connected to the connector 203 of the electronic device 101 may be possible.

The connector 203 may include one or more signal terminals, one or more power terminals electrically connected to the first converter 310 and/or the second converter 320, respectively. According to an embodiment, the electronic device 101 may be connected to the external electronic device 102 (e.g., an accessory) that requires power through the connector 203 by wire. According to an embodiment, the electronic device 101 may be connected to the external electronic device 102 (e.g., a charger) that supplies power through the connector 203 by wire.

The OTG path may indicate a path through which power is provided from the battery 189 to the external electronic device 102 through the first converter 310. Hereinafter, the OTG path may be commonly referred to as a first path. The bypass path may indicate a path through which power is transmitted from the battery 189 to the external electronic device 102 through the second converter 320. Hereinafter, the bypass path may be commonly referred to as a second path.

The connector 203 may include a plurality of terminals. For example, the connector 203 may include a power terminal for supplying or receiving power, an identification terminal for identifying the external electronic device 102, a data terminal for data communication with the external electronic device 102, and/or a ground terminal (not shown). The connector 203 may have a USB connector standard. According to the USB connector standard, the power terminal may correspond to the VBUS terminal of the USB connector, the identification terminal may correspond to a configuration channel (CC) terminal of the USB connector, and the data terminal may correspond to the Dp and Dn terminals of the USB connector.

When the connector 203 is a USB type C connector, there may be two CC terminals in the USB connector. The processor 120 may determine the direction of the cable connected to the connector 203 by using the identification circuit 330, and use one of the CC terminals for the purpose of transmitting power to the external electronic device 102, and use the remaining CC terminal for the purpose of determining which external electronic device 102 is connected to the connector 203 and managing the connection between the electronic device 101 and the external electronic device 102.

The processor 120 may determine whether to cause the electronic device 101 to operate in a host mode or a client mode by using a resistance applied to a pin of the connector 203 according to the features of the external electronic device 102 connected to the electronic device 101. For example, the processor 120 may determine whether to cause the electronic device 101 to operate in the host mode or the client mode by using the Rp/Rd resistor connected to the identification terminal. In detail, the processor 120 may determine the operation mode of the electronic device 101 according to whether each of the CC1 and CC2 pins of the connector 203 are connected to Rp (Pull-up resistor) or Rd (Pull down resistor).

The first converter 310 may be in the form of a low drop out (LDO) regulator or a switching regulator. The first converter 310 may include a buck/booster IC. The processor 120 may control the first converter 310 to convert power input from an external source or the battery 189 into a voltage and a current suitable for use in the electronic device 101. For example, the processor 120 may boost the voltage of the battery 189 to provide a constant current to a system that supplies power to each module of the electronic device 101 through the first converter 310. According to an embodiment, at least some of the functions of the first converter 310 may be performed by the processor 120.

When the external electronic device 102 is connected to the electronic device 101, the processor 120 may boost the voltage of the battery 189 to a voltage required for the external electronic device 102 by using the first converter 310, and supply the power determined depending on the boosted voltage to the external electronic device 102. The boosted voltage may be in the range of 3 V to 9 V. For example, the boosted voltage may be about 5V. As another example, the boosted voltage may be about 9 V. As still another example, the boosted voltage may be about 3.3 V.

The second converter 320 may be in the form of an LDO regulator or a switching regulator. The processor 120 may supply power determined according to a voltage value to which the voltage of the battery 189 is not boosted to the external electronic device 102 through the second converter 320. For example, when the voltage of the battery 189 is 3.6 V, the processor 120 may determine to supply power determined as the voltage of 3.6 V to the external electronic device 102 through the second converter 320. According to an embodiment, at least some of the functions of the second converter 320 may be performed by the processor 120.

The identification circuit 330 may be connected to an identification terminal of the connector 203. The processor 120 may receive identification information of the external electronic device 102 connected to the connector 203 through the identification circuit 330. The processor 120 may receive different types of identification information from the external electronic device 102 through the identification circuit 330 according to whether the electronic device 101 and the external electronic device 102 perform power delivery (PD) communication or data communication. According to an embodiment, the external electronic device 102 may support both data communication and PD communication. As another example, the external electronic device 102 may selectively support either data communication or PD communication.

When the electronic device 101 and the external electronic device 102 perform data communication, the processor 120 may receive the USB ID and/or BCD device information of the external electronic device 102 as identification information of the external electronic device 102. As another example, when the electronic device 101 and the external electronic device 102 perform PD communication through the CC terminal, the processor 120 may receive vendor defined message (VDM) information as the identification information of the external electronic device 102.

When the electronic device 101 and the external electronic device 102 perform PD communication, the processor 120 may additionally receive sink cap information of the external electronic device 102 from the external electronic device 102. The processor 120 may receive information about an operation condition of the external electronic device 102, such as a range of a driving voltage in which the external electronic device 102 is operable and a type of an operable electronic device when connected to the electronic device, through the sync cap information.

As shown in FIG. 3, the identification circuit 330 may be implemented in the form of a chip independent of the processor 120 of the electronic device 101, and alternatively, may be implemented by being included in a part of the processor 120 of the electronic device 101. In one embodiment, the identification circuit 330 may be omitted. For example, in one embodiment, the electronic device 101 may be implemented without including the identification circuit 330.

The MUX IC 340 may be connected to the data terminal of the connector 203. When performing data communication with the external electronic device 102, the processor 120 may receive the identification information of the external electronic device 102 from the external electronic device 102 through the MUX IC 340. The MUX IC 340 may be connected to the processor 120 to receive power from the processor 120.

The processor 120 may be connected to a plurality of modules including the first converter 310, the second converter 320, the identification circuit 330, and the MUX IC 340 through a first signal line. The first signal line (data line) may be a signal line used by the processor 120 to control operations of modules in the electronic device 101.

The processor 120 may be connected to the external electronic device 102 and the identification circuit 330 via the MUX IC 340 through a second signal line. The second signal line may correspond to a signal line used by the processor 120 to receive and process information from the external electronic device 102. The processor 120 may instruct a series of operations related to the external electronic device 102 to individual modules through the second signal line. For example, when USB ID and/or BCD device information is received as identification information from the external electronic device 102, the processor 120 may receive the identification information through the MUX IC 340 and compare the identification information with comparison data stored in a memory (e.g., the memory 130 of FIG. 1). As another example, when VDM information is received from the external electronic device 102 through the identification circuit 330 as identification information, the processor 120 may compare the VDM information with the comparison data stored in the memory 130. The comparison data may include information on the types of external electronic devices 102 that can receive power determined according to the real-time voltage of the battery 189 through the second path.

The external electronic device 102 and the battery 189 may be electrically connected through a power line. The external electronic device 102 and the battery 189 may be electrically connected to each other via one of the first converter 310 or the second converter 320 on the power line. The processor 120 may determine to supply power to the external electronic device 102 through one of the first converter 310 or the second converter 320.

Figure 4A:
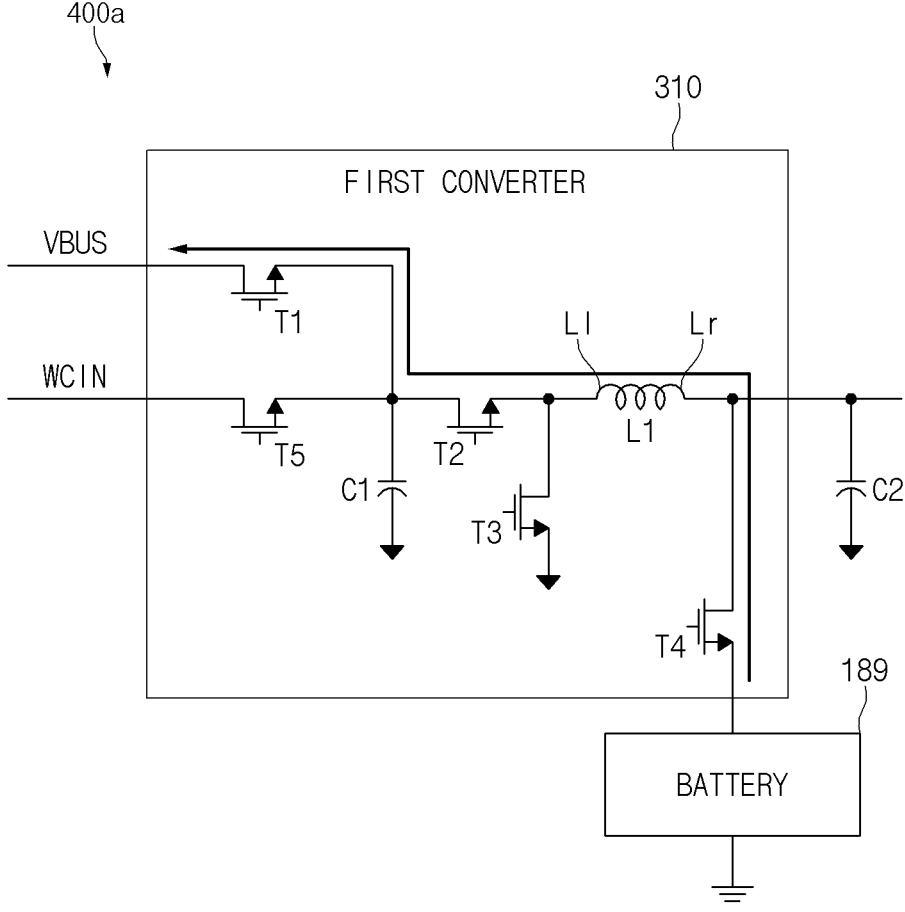
FIG. 4A is a circuit diagram of a first converter according to one embodiment.

FIG. 4A is a circuit diagram 400a of the first converter 310 according to one embodiment. Referring to FIG. 4A, the first converter 310 may include a first transistor T1, a second transistor T2, a third transistor T3, a fourth transistor T4, a fifth transistor T5, a first capacitor C1, a second capacitor C2, and an inductor L1. In FIG. 4A, a case in which all transistors included in the first converter 310 are NMOS transistors will be exemplified to describe a process of boosting the voltage of the battery 189. The gates of all transistors included in the first converter 310 are connected to a processor (e.g., the processor 120 of FIG. 1), respectively. All transistors included in the first converter 310 (e.g., the first transistor T1, the second transistor T2, the third transistor T3, the fourth transistor T4, and/or the fifth transistor T5) may receive a gate signal from the processor 120 to operate.

The power terminal VBUS may be connected to the drain of the first transistor T1. The power terminal VBUS may receive the boosted voltage of the battery 189 via the first transistor T1, the second transistor T2, the inductor L1, and the fourth transistor T4.

The source of the first transistor T1 may be connected to the drain of the second transistor T2. The drain of the second transistor T2 may be connected to the source of the first transistor T1, the source of the fifth transistor T5, and the first capacitor C1. The source of the second transistor T2 may be connected to the drain of the third transistor T3 and the inductor L1. The drain of the third transistor T3 may be connected to the source of the second transistor T2 and the inductor L1. The source of the third transistor T3 may be connected to the ground. One terminal L1 of the inductor L1 may be connected to the source of the second transistor T2 and the drain of the third transistor T3. The remaining terminal Lr of the inductor L1 may be connected to the drain of the fourth transistor T4 and the second capacitor C2.

When the second transistor T2 is turned off, the third transistor T3 may be turned on. In this case, electrical energy supplied to the inductor L1 from the battery 189 may be converted into magnetic energy, which is stored in the inductor L1. When the second transistor T2 is turned on, the third transistor T3 may be turned off. In this case, the voltage boosted from the voltage of the battery 189 is transmitted to the power terminal via the second transistor T2 and the first transistor T1 by using the back electromotive force generated in the inductor L1 due to the sudden voltage change. For example, when the voltage of the battery 189 is 3.6 V, a total voltage of 5 V may be transmitted to the power terminal by using the back electromotive force of 1.4V of the inductor L1.

The power terminal VBUS may correspond to a terminal for wired charging, and the wireless charging terminal WCIN may correspond to a terminal for wireless charging. When an electronic device (e.g., the electronic device 101 of FIG. 1) is wirelessly charged, the voltage of the battery 189 boosted in the above operation may be transmitted to the wireless charging terminal via the fourth transistor T4, the inductor L1, the second transistor T2, and the fifth transistor T5.

FIG. 4B is a circuit diagram 400b of the second converter 320 according to one embodiment. Referring to FIG. 4B, the second converter 320 may include a sixth transistor T6, a seventh transistor T7, an eighth transistor T8, a ninth transistor T9, a tenth transistor T10, and a third capacitor C3. In FIG. 4B, as an example, a case in which all transistors included in the second converter 320 are NMOS transistors will be described for convenience. Each gate of all transistors included in the second converter 320 may be connected to the processor 120 (e.g., the processor 120 of FIG. 1), and all transistors included in the second converter 320 may receive a gate signal from the processor 120 to operate.

The power terminal VBUS may receive the voltage of the battery 189 via the sixth transistor T6, the seventh transistor T7, and the eighth transistor T8. The drain of the sixth transistor T6 may be connected to the power terminal, and the source of the sixth transistor T6 may be connected to the drain of the seventh transistor T7. The source of the seventh transistor T7 may be connected to the drain of the eighth transistor T8 and the first electrode C1 of the third capacitor C3.

The drain of the eighth transistor T8 may be connected to the source of the seventh transistor T7 and the first electrode C1 of the third capacitor C3. The source of the eighth transistor T8 may be connected to the battery 189 and the drain of the ninth transistor T9. The drain of the ninth transistor T9 may be connected to the battery 189 and the source of the eighth transistor T8. The source of the ninth transistor T9 may be connected to the second electrode Cr of the third capacitor C3 and the drain of the tenth transistor T10. The drain of the tenth transistor T10 may be connected to the source of the ninth transistor T9 and the second electrode Cr of the third capacitor C3. The source of the tenth transistor T10 may be connected to the battery 189 and the ground.

After the operation signal is received from the processor 120 and the eighth transistor T8 is turned on, the tenth transistor T10 may be turned on to charge the third capacitor C3. The third capacitor C3 may be arranged to check whether an internal circuit of the second conductor is short-circuited. After the third capacitor C3 is charged, the seventh transistor T7 and the sixth transistor T6 may receive the operation signal from the processor 120 and the seventh transistor T7 and the sixth transistor T6 may be sequentially turned on. While the processor 120 sequentially turns on the eighth transistor T8, the tenth transistor T10, the seventh transistor T7, and the sixth transistor T6, the ninth transistor T9 may remain in an off state.

Figure 5A:
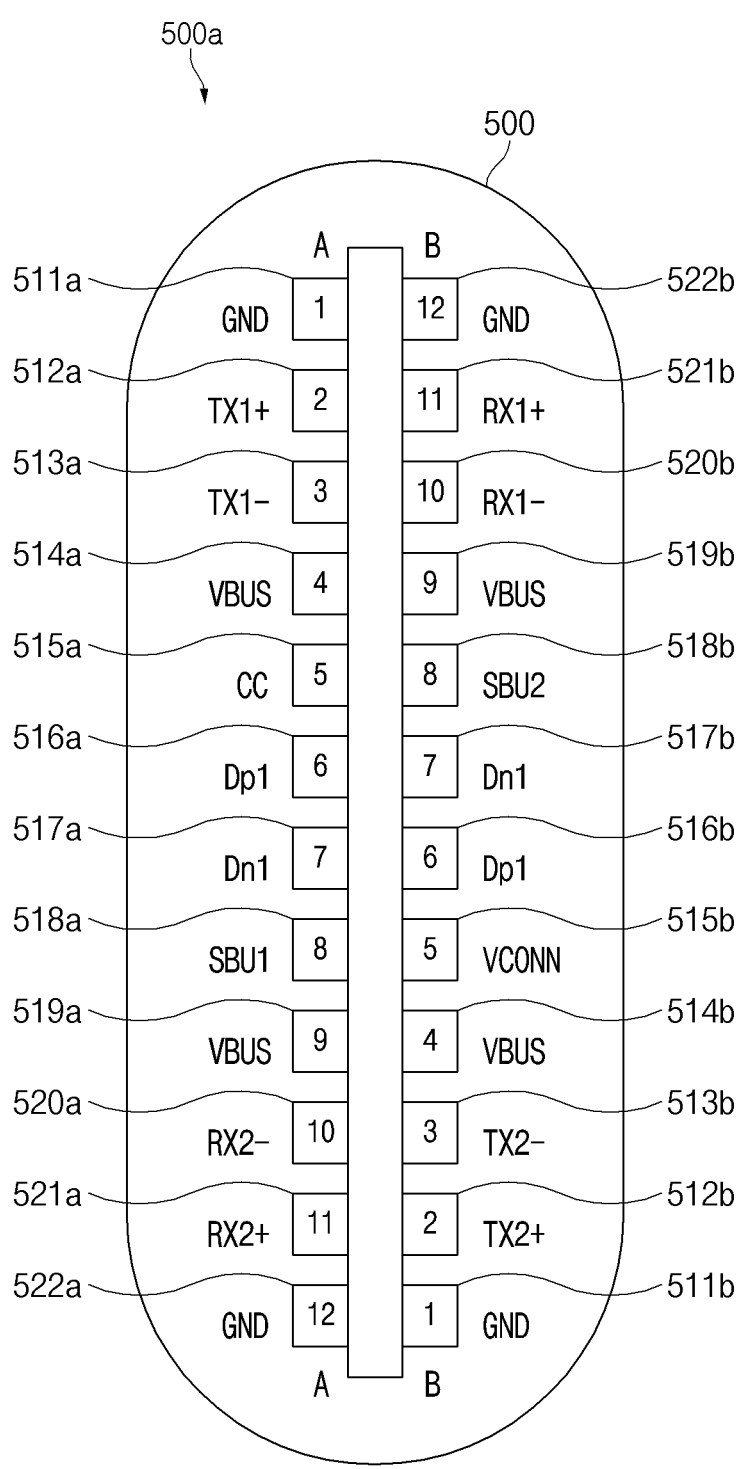
FIG. 5A is a view illustrating a plurality of terminals inside a connector.

FIG. 5A is a diagram 500a illustrating a plurality of terminals inside a connector 500 (e.g., the connector 203 of FIG. 2). Referring to FIG. 5A, the connector 500 may be a USB Type-C connector. The connector 500 may include a plurality of pins. According to one embodiment, the connector 500 may include a plurality of first pins on a first surface (e.g., surface A) corresponding to the forward direction and a plurality of second pins on a second surface (e.g., surface B) corresponding to the reverse direction. For example, the plurality of first pins may include GND pin 511a, TX1+ pin 512a, TX1-pin 513a, VBUS pin 514a, CC pin 515a, Dp1 pin 516a, Dn1 pin 517a, SBU1 pin 518a pin, VBUS pin 519a, RX2-pin 520a, RX2+ pin 521a, and GND pin 522a. For example, the plurality of second pins may include GND pin 511b, TX2+ pin 512b, TX2-pin 513b, VBUS pin 514b, VCONN pin 515b, Dp1 pin 516b, Dn1 pin 517b, SBU1 pin 518b, VBUS pin 519b, RX1-pin 520b, RX1+ pin 521b, and GND pin 522b.

An electronic device (e.g., the electronic device 101 of FIG. 1) may be electrically connected to an external electronic device (e.g., the electronic device 102 of FIG. 1) through the connector 500. The connector 500 of the electronic device 101 may have an external shape such that the connector of the external electronic device 102 can be inserted in a forward direction or a reverse direction. For example, the arrangement order of the twelve pins formed on the first surface may be formed in the same order as the arrangement order of the twelve pins formed on the second surface, such that the connector of the external electronic device 102 can be inserted in the direction of the first surface or the second surface. Due to such a structure, the user may insert the connector of the external electronic device 102 into the connector 500 of the electronic device 101 while being rotated by 180 degrees.

FIG. 5B is a diagram 500b illustrating an arrangement of pins formed on the first and second surfaces of a contact substrate (e.g., the contact substrate 205 of FIG. 2) formed inside a connector (e.g., the connector 203 of FIG. 2). Referring to FIG. 5B, a plurality of pins included in a USB may be classified into pins for transmitting/receiving data and signals or pins for transmitting/receiving power.

A plurality of pins for transmitting/receiving data and transmitting/receiving signals may include TX1+ pin, TX2+ pin, TX1− pin, TX2− pin, CC pin, Dp1 pins, Dn1 pins, SBU1 pin, SBU pin, RX2− pin, RX1− pin, RX2+ pin, and the RX1+ pin. The TX1+ and TX2+ pins 512a and 512b and the TX1− and TX2− pins 513a and 513b may be pins for super speed transmission (TX) capable of fast data transmission. The CC pin 515a may be a pin serving as an identification terminal. Dp1 pins 516a and 516b and Dn1 pins 517a and 517b may be pins for different bidirectional USB signals. The SBU1 and SBU2 pins 518a and 518b, which are redundant pins, may be pins that can be used for various signals such as audio signals and display signals. The RX2− and RX1− pins 520a and 520b, and the RX2+ and RX1+ pins 521a and 521b may be pins for super speed reception (RX) capable of fast data reception.

The plurality of pins for power transmission and reception may include VBUS pins and VCONN pins. The VBUS pins 514a and 514b may be pins for USB cable charging power. The VCONN pin 515b may be a pin for supporting plug power.

Figure 6A:
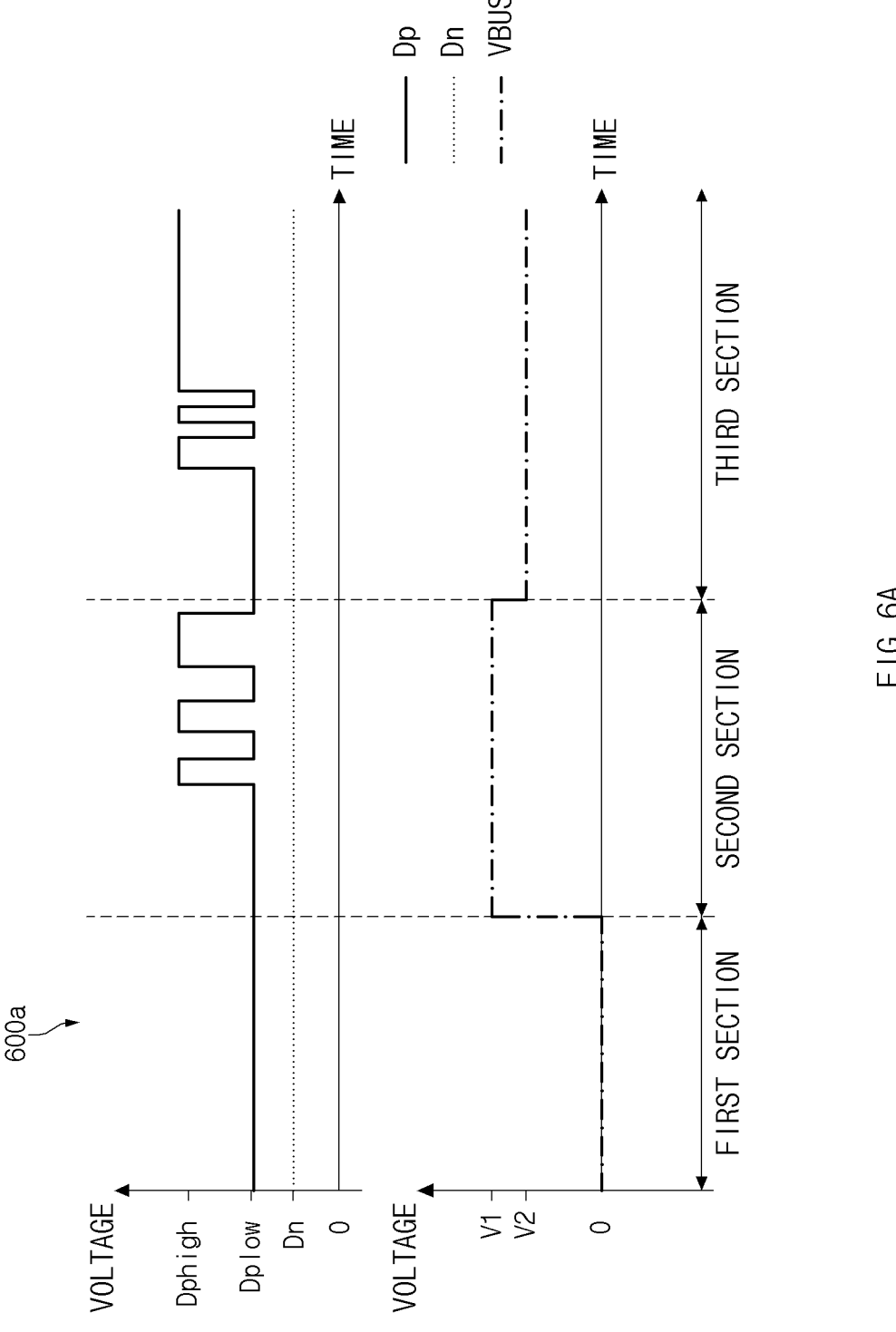
FIG. 6A illustrate an exemplary operation waveform when an electronic device and an external electronic device perform data communication.

FIG. 6A is an exemplary operation waveform 600a when an electronic device (e.g., the electronic device 101 of FIG. 1) and an external electronic device (e.g., the electronic device 102 of FIG. 1) perform data communication. Referring to FIG. 6A, Dp and Dn may mean signals of data terminals included in a connector (e.g., the connector 203 of FIG. 2), and VBUS may mean a voltage of a power terminal included in the connector 203.

In a first section, a processor (e.g., the processor 120 of FIG. 1) may determine whether the electronic device 101 and the external electronic device 102 are connected. When connected, the processor 120 may determine the function of the electronic device 101. For example, the processor 120 may determine whether the electronic device 101 operates as a source device or a sink device through an identification circuit (e.g., the identification circuit 330 of FIG. 3). In the first section, communication between the electronic device 101 and the external electronic device 102 through the data lines Dp and Dn in the connector 203 may not proceed. According to an embodiment, the voltage of the power terminal may also be maintained at 0 V.

In a second section, the processor 120 may supply the boosted voltage (e.g., V1) to the external electronic device

102 through the first path. For example, the value of the boosted voltage may be 5 V. The processor 120 may perform data communication with the external electronic device 102 by using the data lines Dp and Dn of the connector 203 included in the electronic device 101. The processor 120 may receive the identification information of the external electronic device 102 from the external electronic device 102 through data communication. The processor 120 may compare the identification information received from the external electronic device 102 with comparison data stored in a memory (e.g., the memory 130 of FIG. 1). The comparison data may include identification information of the external electronic devices 102 that can receive power from the electronic device 101 by using the second path.

Figure 8:
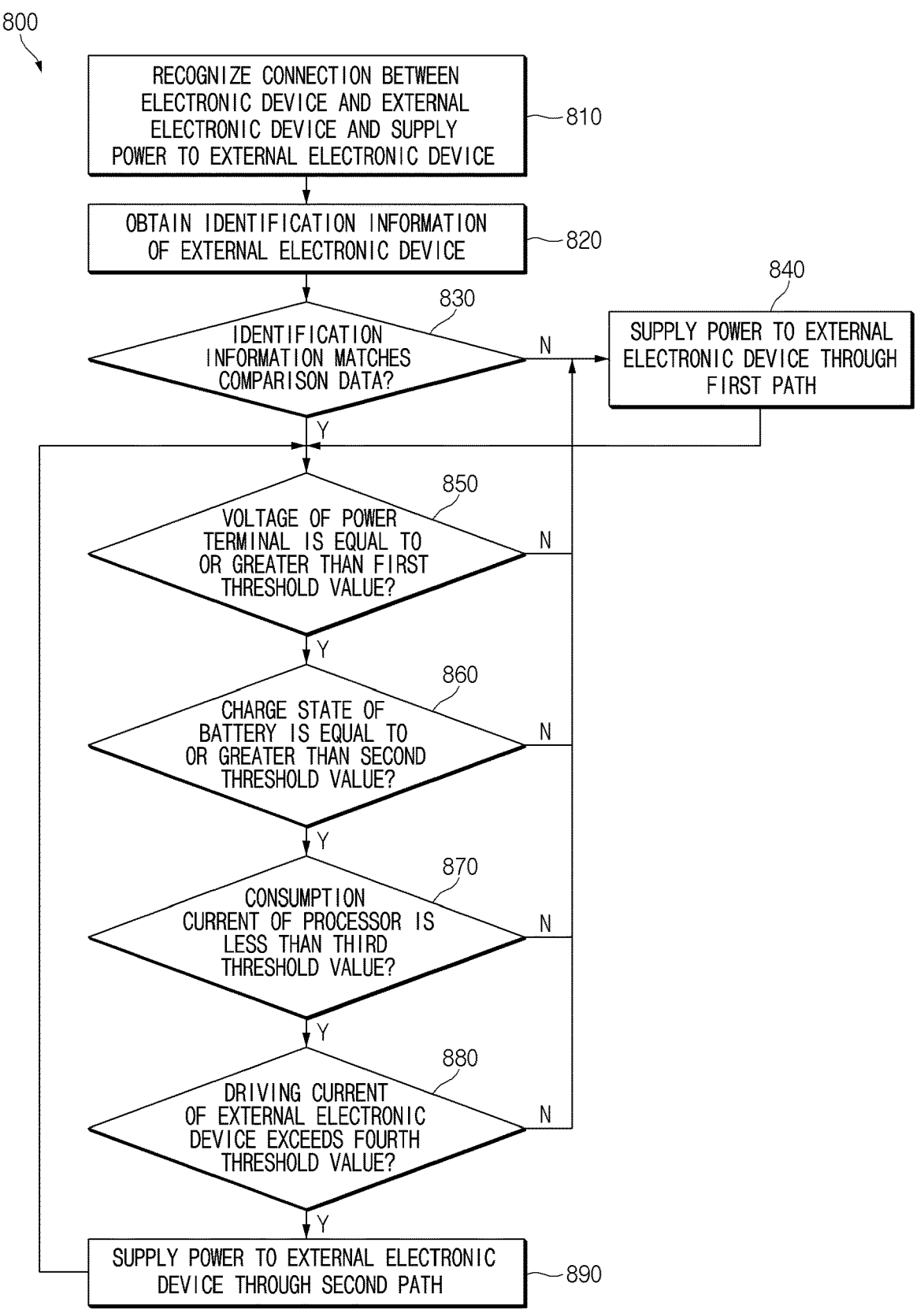
FIG. 8 is a view illustrating an operation in which a processor selects a first path or a second path to supply power to an external electronic device.

The processor 120 may compare the identification information with the comparison data and, when the same, additionally determine whether a specified condition described later in FIG. 8 is satisfied. When it is determined that the specified condition is satisfied, the processor 120 may supply power to the external electronic device 102 by using the second path. When it is determined that the specified condition is not satisfied, the processor 120 may use the first path to supply power to the external electronic device 102.

When the identification information and the comparison data are not the same, the processor 120 may maintain supplying power based on the existing boosted voltage using the first path. When the identification information and the comparison data are not the same, a case in which information corresponding to the identification information does not exist in the comparison data may be included.

In a third section, a case in which the identification information and the comparison data are the same and the processor 120 determines that the specified condition is satisfied is exemplarily illustrated. The processor 120 may determine to supply the external electronic device 102 with power determined according to the power of a battery (e.g., the battery 189 of FIG. 1), not the boosted power, by using the second path. The processor 120 may perform an operation related to driving the external electronic device 102 through data communication with the external electronic device 102. When, in the third section, the processor 120 determines that the identification information and the information included in the comparison data are not the same, the processor 120 may maintain the voltage of the power terminal at the level of the boosted voltage and may determine to supply the external electronic device 102 with the power according to the boosted voltage.

When the electronic device 101 and the external electronic device 102 perform data communication, the processor 120 may receive the USB ID and/or BCD device information of the external electronic device 102 from the external electronic device 102 as the identification information of the external electronic device 102.

USB ID may include USB VID (vendor ID) and PID (product ID). The USB VID may include the ID of a manufacturer who manufactured the USB, and the PID may include the product unique number of the manufacturer. The BCD device information may include a version number of the electronic device 101. The version number may include information such as a production number, a product number, and a serial number. Following Table 1 is an exemplary table illustrating USB ID comparison data stored in the memory 130.

TABLE 1

| No. | USB VID | USB PID | State |
|---|---|---|---|
| 1 | 0419 | 0600 | Boosting |
| 2 | 0419 | 0700 | Bypass |
| 3 | 0416 | 5518 | Bypass |
| 4 | 040b | 01dc | Boosting |

According to Table 1, for example, when the processor 120 recognizes the USB VID of the external electronic device 102 as 0419 and the USB PID as 0600 through the connector 203, the processor 120 may determine the boosting operation, and boost the voltage of the battery 189 (e.g., V1) to supply power to the external electronic device 102 through the first path. As another example, when the processor 120 recognizes the USB VID of the external electronic device 102 as 0419 and the USB PID as 0700 through the connector 203, the processor 120 may determine that the power determined according to the voltage (e.g., V2) of the battery 189 can be supplied to the external electronic device 102 through the second path.

When it is determined that the identification information of the external electronic device 102 and the comparison data included in the memory 130 are the same, and further determined that a specified condition described later in FIG. 8 is satisfied, the processor 120 may determine to supply the power determined according to the voltage of the battery 189 to the external electronic device 102 through the second path.

Figure 6B:
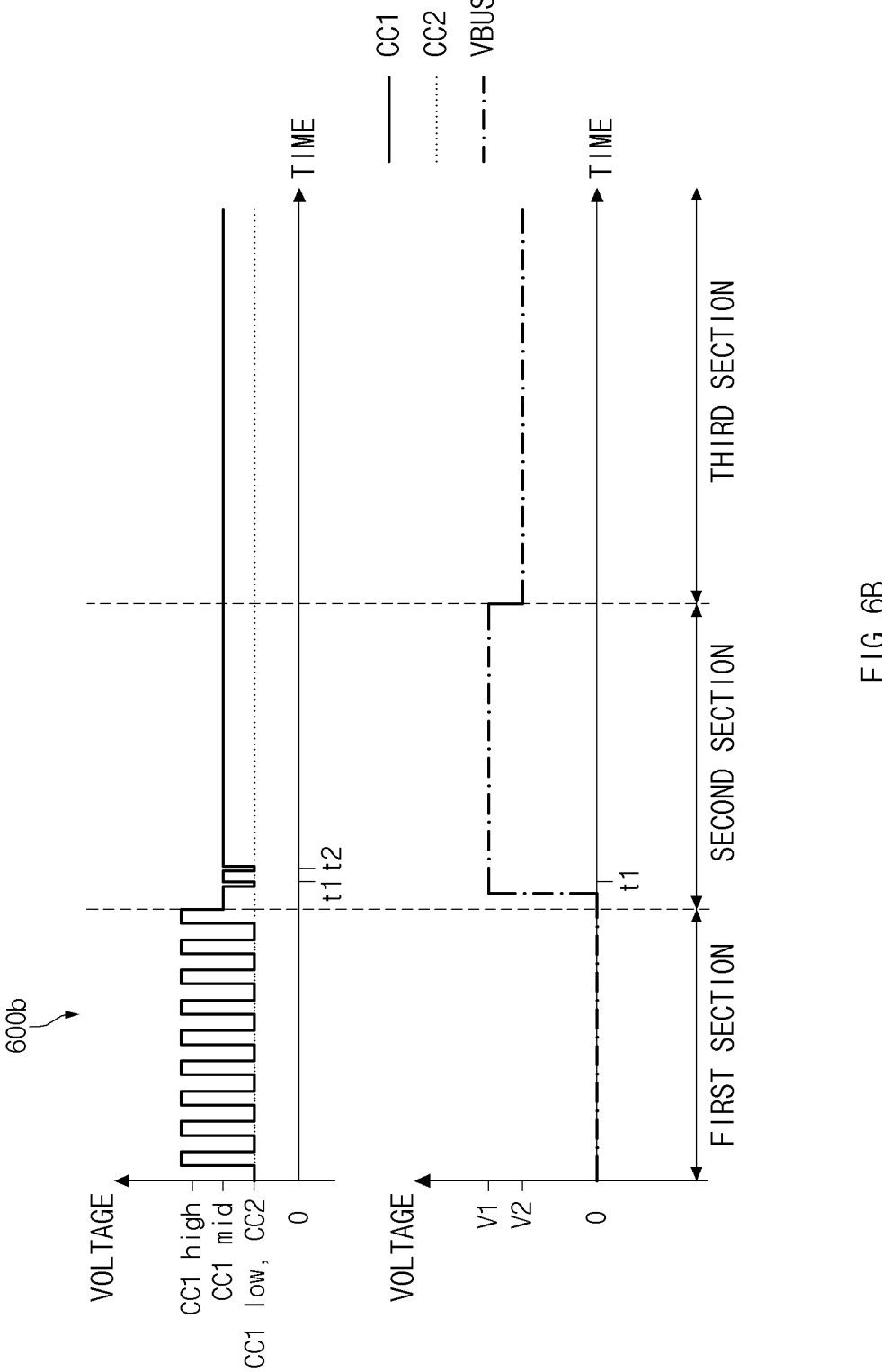
FIG. 6B illustrates an exemplary operation waveform when an electronic device and an external electronic device perform power delivery (PD) communication.

FIG. 6B is an exemplary operation waveform 600b when an electronic device (e.g., the electronic device 101 of FIG. 1) and an external electronic device (e.g., the electronic device 102 of FIG. 1) perform power delivery (PD) communication. Referring to FIG. 6B, reference numerals CC1 and CC2 may represent the voltages of an identification terminal, and VBUS may represent the voltage of a power terminal.

In a first section, a processor (e.g., the processor 120 of FIG. 1) may determine whether the electronic device 101 and the external electronic device 102 are connected, and determine the function of the electronic device 101. For example, the processor 120 may determine whether the electronic device 101 operates as a source device or a sink device through an identification circuit (e.g., the identification circuit 330 of FIG. 3). In the first section, the processor 120 may use the identification circuit 330 to toggle a first identification voltage CC1 of the identification terminal CC in a connector (e.g., the connector 203 in FIG. 2). The processor 120 may determine whether the electronic device 101 operates as a source device or a sink device while toggling the first identification voltage CC1. According to an embodiment, the voltage of the power terminal may also be maintained at 0 (zero) V.

In the second section, the processor 120 may supply the boosted voltage (e.g., V1) to the external electronic device 102 through the first path. For example, the value of the boosted voltage may be 5 V. When the processor 120 determines that the electronic device 101 operates as the source device, the voltage of the identification terminal CC is fixed to the CC1 mid voltage except for a first time t1 and a second time t2. In this case, at the first time t1 and the second time t2, the processor 120 performs PD communication through the identification terminal CC to receive the identification information of the external electronic device 102 from the external electronic device 102.

The processor 120 may compare the identification information received from the external electronic device 102 with comparison data stored in a memory (e.g., the memory 130 of FIG. 1). The comparison data may include the identification information of the external electronic device 102 that can receive power from the electronic device 101 by using the second path. The processor 120 may compare the identification information with the comparison data and, when the same, additionally determine whether the specified condition described later in FIG. 8 is satisfied.

When determining that the specified condition is satisfied, the processor 120 may supply power to the external electronic device 102 by using the second path. When determining that the specified condition is not satisfied, the processor 120 may use the first path to supply power to the external electronic device 102. When the identification information and the comparison data are not the same, the processor 120 may maintain supplying power based on the existing boosted voltage to the external electronic device 102 using the first path.

In a third section, a case in which the identification information and the comparison data are the same and the processor 120 determines that the specified condition is satisfied is exemplarily illustrated. The processor 120 may determine to supply the external electronic device 102 with power determined according to the voltage (e.g., V2) of a battery (e.g., the battery 189 of FIG. 1), not the boosted power, by using the second path. The processor 120 may perform an operation related to driving the external electronic device 102 through data communication. When, in the third section, the identification information and the information included in the comparison data are not the same, the processor may maintain the voltage of the power terminal to the level of the boosted voltage (e.g., V1), and supply the power according to the boosted voltage to the external electronic device 102.

When the electronic device 101 and the external electronic device 102 performs PD communication through the CC pin, the processor 120 may receive vendor defined message (VDM) information as the identification information of the external electronic device 102. The VDM may include vendor ID (VID), product ID (PID), and/or XID information. The upper 16 bits of the VDM information may correspond to the VID.

FIG. 7 is a flowchart illustrating an operation in which an electronic device (e.g., the electronic device 101 of FIG. 1) transmits power to an external electronic device (e.g., the electronic device 102 of FIG. 1) by using the second path. Referring to FIG. 7, in operation 710, a processor (e.g., the processor 120 of FIG. 1) may be connected to the external electronic device 102 through the connector 203 to obtain the identification information of the external electronic device 102. In operation 720, the processor 120 may determine whether the identification information obtained from the external electronic device 102 matches the comparison data stored in a memory (e.g., the memory 130 of FIG. 1). In operation 730, when the identification information and the comparison data match, the processor 120 may determine whether the voltage of the power terminal VBUS satisfies a specified condition. In operation 740, based on whether the specified condition is satisfied, the processor 120 may bypass the power determined according to the real-time voltage of the battery (e.g., the battery 189 of FIG. 1) through the second path to transmit the power to the external electronic device 102.

FIG. 8 is a flowchart 800 illustrating an operation in which a processor (e.g., the processor 120 of FIG. 1) selects a first path or a second path to supply power to an external electronic device (e.g., the electronic device 102 of FIG. 1). Referring to FIG. 8, in operation 810, the processor 120 may recognize the connection between the electronic device (e.g., the electronic device 101 of FIG. 1) and the external electronic device 102, and allow the electronic device 101 to supply power to the external electronic device 102. When the connector (e.g., the connector 203 of FIG. 2) of the electronic device 101 and the external connector (e.g., the external connector 207 of FIG. 2) of the external electronic device 102 are connected, the processor 120 may recognize that the electronic device 101 and the external electronic device 102 are connected. According to an embodiment, after recognizing the connection between the electronic device 101 and the external electronic device 102, the processor 120 determines whether the electronic device 101 operates as a source device or a sink device. For example, when the electronic device 101 operates as a source device, the electronic device 101 may supply power to the external electronic device 102.

In operation 820, the processor 120 may obtain the identification information of the external electronic device 102. In operation 830, the processor 120 may determine whether the identification information and comparison data match. The content of the identification information and the content of the processor 120 determining whether the identification information and the comparison data stored in the memory (e.g., the memory 130 of FIG. 1) match are the same as those described in FIGS. 6A and 6B, so the details will be omitted.

According to an embodiment, when the identification information and the comparison data do not match in operation 830 (No), the processor 120 may supply the power from the electronic device 101 to the external electronic device 102 through the first path in operation 840. According to an embodiment, when the processor 120 supplies the power determined according to the boosted voltage to the external electronic device 102 in operation 840, the processor 120 may adjust the boost level of the battery (e.g., the boost level of the battery 189 of FIG. 1) by using the minimum driving voltage of the external electronic device 102. According to an embodiment, when the processor 120 supplies power from the electronic device 101 to the external electronic device 102 through the first path, the processor 120 may adjust the switching frequency of a first digital block (not shown) included in the first converter (e.g., the first converter 310 of FIG. 3).

According to an embodiment, adjusting the boost level of the battery 189 and adjusting the switching frequency of the first digital block may correspond to the selective operations of the processor 120. For example, the processor 120 may not adjust both the boost level of the battery 189 and the switching frequency of the first digital block. As another example, the processor 120 may perform one of an operation of adjusting the boost level of the voltage of the battery 189 or an operation of adjusting the switching frequency of the first digital block. As still another example, the processor 120 may adjust both the boost level of the battery 189 and the switching frequency of the first digital block.

According to an embodiment, the processor 120 may reduce the current consumption of the electronic device 101 by adjusting the boost level of the battery 189 and/or the switching frequency of the first digital block. The processor 120 may reduce the current consumption of the electronic device 101 so that the user experience is increased by minimizing the power consumption of the battery 189, improving the duration of the battery 189, and preventing deterioration of the battery 189.

Following Table 2 illustrates the current consumption according to the adjustment of the voltage boost level of the battery 189 when power is supplied to the external electronic device 102 through the first path. According to one embodiment, the voltage of the battery 189, the driving current of the external electronic device 102, and the boost level of the battery 189 are only exemplary values, and various values may be selected. In this embodiment, a case in which the boost level of the battery 189 is adjusted to 4.4 V by setting the minimum driving voltage of the external electronic device 102 to 4.2 V will be described as an example.

TABLE 2

| Battery voltage | Driving current of external electronic | Consumption current of electronic device | |
| --- | --- | --- | --- |
| [V] | device [mA] | Boost to 4.4 V | Boost to 5.1 V |
| 4.35 | 0 | 3.7 | 4.9 |
| | 10 | 13.9 | 17.2 |
| | 30 | 35.5 | 41.6 |
| | 50 | 57.2 | 66.6 |
| | 100 | 112 | 129.1 |
| 4.1 | 0 | 4.3 | 5.2 |
| | 10 | 15.1 | 18.3 |
| | 30 | 38.5 | 45 |
| | 50 | 59.2 | 72.4 |
| | 100 | 114.8 | 137.5 |
| 3.5 | 0 | 5.1 | 6.3 |
| | 10 | 18.3 | 22.5 |
| | 30 | 45.7 | 56.2 |
| | 50 | 73.3 | 86.8 |
| | 100 | 138.5 | 162.8 |

According to one embodiment, the processor 120 may reduce the boost level to 4.4V regardless of the voltage of the battery 189 and the driving current of the external electronic device 102, so that the current consumption of the electronic device 101 may be lower than when the boost level is maintained at 5.1 V.

According to an embodiment, when the identification information and the comparison data match in operation 830 (Yes), the processor 120 may determine whether the voltage of the power terminal is equal to or greater than a first threshold value in operation 850.

According to an embodiment, when the voltage of the power terminal is less than the first threshold value in operation 850 (No), the processor 120 may supply power through the first path in operation 840. For example, the first threshold value may represent the minimum driving voltage of the external electronic device 102.

According to an embodiment, when the voltage of the power terminal is less than the first threshold value, the processor 120 may boost the voltage of the battery 189 to supply power to the external electronic device 102, thereby preventing an operation of supplying power based on a voltage less than the driving voltage of the external electronic device 102 or supplying power based on an unstable voltage.

According to an embodiment, when the voltage of the power terminal is equal to or greater than the first threshold value in operation 850 (Yes), the processor 120 may determine whether the charge state of the battery 189 is greater than or equal to a second threshold value in operation 860. According to an embodiment, when the charge state of the battery 189 is less than the second threshold value in operation 860 (No), the processor 120 may transmit power to the external electronic device 102 through the first path in operation 840. The second threshold value may be a value preset in the system or a value set by a user. For example, the second threshold value may be 10%. This numerical value is merely an exemplified value for convenience of description, and various numerical values may be selected.

When the charge state of the battery 189 is less than the second threshold value, the processor 120 may boost the voltage of the battery 189 to supply power to the external electronic device 102, so that it is possible to prevent supplying power to the external electronic device 102 based on the voltage less than the minimum driving voltage of the external electronic device 102, or prevent supplying power based on an unstable voltage to the external electronic device 102. According to an embodiment, even though the voltage of the power terminal of the electronic device 101 is lowered due to additional current consumption in the external electronic device 102, it is possible to prevent the power supply from the electronic device 101 to the external electronic device 102 from being stopped.

According to an embodiment, when the charge state of the battery 189 is equal to or greater than the second threshold value in operation 860 (Yes), in operation 870, the processor 120 may determines whether the consumption current of the processor 120 is less than the third threshold. According to an embodiment, when the consumption current of the processor 120 is equal to or greater than the third threshold value in operation 870 (No), the processor 120 may supply power to the external electronic device 102 through the first path in operation 840. The third threshold value may be a value preset in the system or a value set by a user. For example, the third threshold value may be 4 A. This numerical value is merely an exemplified value for convenience of description, and various numerical values may be selected.

When the consumption current of the processor 120 increases, because the system power provided to each module of the electronic device 101 decreases, it is possible to supply power to the external electronic device 102 based on an unstable voltage. Accordingly, when the consumption current of the processor 120 is equal to or greater than the third threshold value, the processor 120 may recognize that the system power is reduced due to the excessive consumption current and boost the voltage of the battery 189 to stably supply power to the external electronic device 102.

According to an embodiment, when the consumption current of the processor 120 is less than the third threshold value in operation 870 (Yes), in operation 880, the processor 120 may determine whether the driving current of the external electronic device 102 exceeds a fourth threshold value. According to an embodiment, when the driving current of the external electronic device 102 is equal to or less than the fourth threshold value in operation 880 (No), in operation 840, the processor 120 may supply power to the external electronic device 102 through the first path. The fourth threshold value may be determined differently depending on the type of the external electronic device 102 or may be arbitrarily selected by a user. For example, the fourth threshold value may be 10 mA. This numerical value is merely an exemplified value for convenience of description, and various numerical values may be selected. As an example, the operation 880 will be described below with reference to Tables 2 and 3 with the fourth threshold value being 5 mA.

Following Table 3 illustrates the consumption current of the electronic device 101 as a result of using the driving current of the external electronic device 102 and the voltage of the battery 189 as variables when the voltage of the battery 189 is boosted to 5.1 V to supply power to the external electronic device 102. For convenience of explanation, the boosted voltage value is 5.1 V as an example, but the embodiment may be practiced based on various voltage levels.

TABLE 3

| Battery voltage [V] | Driving current of external electronic device [mA] | Consumption current of electronic device [mA] |
| --- | --- | --- |
| 4.35 | 0 | 4.9 |
| | 10 | 17.2 |
| | 30 | 41.6 |
| | 50 | 66.6 |
| | 100 | 129.1 |
| 4.1 | 0 | 5.2 |
| | 10 | 18.3 |
| | 30 | 45 |
| | 50 | 72.4 |
| | 100 | 137.5 |
| 3.5 | 0 | 6.3 |
| | 10 | 22.5 |
| | 30 | 56.2 |
| | 50 | 86.8 |
| | 100 | 162.8 |

Following Table 4 illustrates the consumption current of the electronic device 101 as a result of using the driving current of the external electronic device 102 and the voltage of the battery 189 as variables when the voltage of the battery 189 is not boosted. For convenience of description, values of the voltage of the battery 189 are exemplified as 4.35 V, 4.1 V and 3.5 V, but various voltage levels may be selected to practice the embodiment.

TABLE 4

| Battery voltage [V] | Driving current of external electronic device [mA] | Consumption current of electronic device [mA] |
| --- | --- | --- |
| 4.35 | 0 | 6.7 |
| | 10 | 16 |
| | 30 | 36.1 |
| | 50 | 56.2 |
| | 100 | 106.2 |
| 4.1 | 0 | 6.2 |
| | 10 | 15.6 |
| | 30 | 35.6 |
| | 50 | 55.7 |
| | 100 | 105.7 |
| 3.5 | 0 | 5.6 |
| | 10 | 15 |
| | 30 | 35 |
| | 50 | 55.1 |
| | 100 | 105.1 |

According to Tables 3 and 4 above, the current consumption value of the electronic device 101 when boosting the voltage of the battery 189 based on the driving current of the external electronic device 102 and the voltage of the battery 189 may be lower than that when not boosting the voltage of the battery 189.

For example, when the external electronic device 102 is in the standby state, the driving current is 0 mA and the voltage of the battery 189 is 4.35 V, it may be understood that the value (4.9 mA) of the consumption current of the electronic device 101 derived when the voltage of the battery 189 is boosted is less than the value (6.7 mA) derived when the voltage of the battery 189 is not boosted. As another example, when the voltage of the battery 189 is 4.1 V, it may be understood that the value (5.2 mA) of the consumption current of the electronic device 101 derived when the voltage of the battery 189 is boosted is less than the value (6.2 mA) derived when the voltage of the battery 189 is not boosted.

Accordingly, according to the embodiment, when the driving current of the external electronic device 102 is 5 mA or less that is the fourth threshold value, boosting the voltage of the battery 189 to supply power may be more efficient than supplying power using the voltage of the battery 189 as it is.

According to an embodiment, when the driving current of the external electronic device 102 exceeds the fourth threshold value in operation 880 (Yes), in operation 890, the processor 120 may supply power to the external electronic device 102 through the second path. In operation 890, the processor 120 may adjust the switching frequency of the second digital block (not shown) included in the second converter (e.g., the second converter 320 of FIG. 3).

The adjustment of the switching frequency of the second digital block may correspond to a selective operation of the processor 120. For example, the processor 120 may supply power to the external electronic device 102 through the second path without adjusting the switching frequency of the second digital block included in the second conductor. As another example, the processor 120 may supply power to the external electronic device 102 through the second path while adjusting the switching frequency of the second digital block included in the second conductor. The processor 120 may adjust the switching frequency of the second digital block based on parameters such as power transfer efficiency and/or output ripple of power.

Following Table 5 illustrates information about the current consumption of the electronic device 101 when the processor 120 supplies power to the external electronic device 102 through the second path and changes the switching frequency of the second digital block included in the second conductor. The voltage of the battery 189, the driving current of the external electronic device 102, and each frequency value are merely exemplary values, and various values may be selected.

TABLE 5

| Battery voltage [V] | Driving current of external electronic device [mA] | Consumption current of electronic device [mA] | | |
|---|---|---|---|---|
| | | Minimum frequency | Middle frequency | Maximum frequency |
| 4.35 | 0 | 3.7 | 6.7 | 12.3 |
| | 10 | 13 | 16 | 21.6 |
| | 30 | 33 | 36.1 | 41.6 |
| | 50 | 53 | 56.2 | 61.6 |
| | 100 | 103 | 106.2 | 111.6 |
| 4.1 | 0 | 3.4 | 6.2 | 11.3 |
| | 10 | 12.7 | 15.6 | 20.6 |
| | 30 | 32.7 | 35.6 | 40.6 |
| | 50 | 52.7 | 55.7 | 60.6 |
| | 100 | 102.7 | 105.7 | 110.6 |
| 3.5 | 0 | 3.2 | 5.6 | 9.6 |
| | 10 | 12.5 | 15 | 18.9 |
| | 30 | 32.5 | 35 | 38.9 |
| | 50 | 52.5 | 55.1 | 58.9 |
| | 100 | 102.5 | 105.1 | 108.9 |

According to one embodiment, as the processor 120 decreases the switching frequency of the second digital block included in the second conductor, the current consumption of the electronic device 101 may decrease.

The processor 120 may check whether a specified condition is satisfied every specified time while performing operation 890. The specified time may correspond to a time preset in the system or a time set separately by a user. The processor 120 may check whether each condition of operations 850 to 880 is satisfied every specified time, and when any one of them is not satisfied, in operation 840, the processor 120 may supply power to the external electronic device 102 through the first path.

According to one embodiment, when the processor 120 supplies power to the external electronic device 102 through the first path or the second path, power transfer efficiency is shown in Table 6 below. Table 6 illustrates information about the power transfer efficiency when the first path is used and the power transfer efficiency when the second path is used as the result values using the voltage of the battery 189 and the driving current of the external electronic device 102 as variables.

TABLE 6

| Battery voltage [V] | Driving current of external electronic device [mA] | Power transfer efficiency in using first path [%] | Power transfer efficiency in using second path [%] |
|---|---|---|---|
| 4.35 | 10 | 50 | 63 |
| | 30 | 62 | 83 |
| | 50 | 64 | 89 |
| | 100 | 66 | 94 |
| 4.1 | 10 | 44 | 64 |
| | 30 | 54 | 84 |
| | 50 | 56 | 90 |
| | 100 | 58 | 95 |
| 3.5 | 10 | 31 | 67 |
| | 30 | 37 | 86 |
| | 50 | 40 | 91 |
| | 100 | 42 | 95 |

The voltage of the battery 189 and the driving current of the external electronic device 102 used as variables in Table 6 are only exemplary values, and various values may be selected. According to Table 6, regardless of the voltage of the battery 189, when the driving current of the external electronic device 102 is 50 mA or more, the power transfer efficiency using the second path may approach to 90%. According to one embodiment illustrated in Table 6, when the processor 120 supplies power to the external electronic device 102 through the second path rather than the first path, the power transfer may be more efficient, so that the it is possible to use power of the battery 189 more efficiently, improve the duration of the battery 189, and prevent deterioration of the battery 189 to increase the user experience.

FIG. 9 is a block diagram 900 illustrating the power management module 188 and the battery 189 according to one embodiment. Referring to FIG. 9, the power management module 188 may include charging circuitry 910, a power adjuster 920, or a power gauge 930. The charging circuitry 910 may charge the battery 189 by using power supplied from an external power source outside the electronic device 101. According to an embodiment, the charging circuitry 910 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 920 may generate a plurality of powers having different voltage levels or different current levels by adjusting a voltage level or a current level of the power supplied from the external power source or the battery 189. The power adjuster 920 may adjust the voltage level or the current level of the power supplied from the external power source or the battery 189 into a different voltage level or current level appropriate for each of some of the components included in the electronic device 101. According to an embodiment, the power adjuster 920 may be implemented in the form of a low drop out (LDO) regulator or a switching regulator. The power gauge 930 may measure use state information about the battery 189 (e.g., a capacity, a number of times of charging or discharging, a voltage, or a temperature of the battery 189).

The power management module 188 may determine, using, for example, the charging circuitry 910, the power adjuster 920, or the power gauge 930, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 940. The PCM 940 may perform one or more of various functions (e.g., a pre-cutoff function) to prevent a performance deterioration of, or a damage to, the battery 189. The PCM 940, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 930, or the power management module 188. According to an embodiment, the corresponding sensor (e.g., a temperature sensor) of the sensor module 176 may be included as part of the PCM 940, or may be disposed near the battery 189 as a separate device.

According to an embodiment, the electronic device 101 may include the battery 189, the memory 130, the connector 203 including one or more signal terminals, the first converter 310 included in a first path that connects the battery 189 to the connector 203, the second converter 320 included in a second path that is distinct from the first path and connects the battery 189 to the connector 203, and the processor 120 electrically connected to the battery 189, the memory 130, the connector 203, the first converter 310, and the second converter 320, wherein the memory 130 stores instructions that, when executed, cause the processor 120 to obtain identification information of the external electronic device 102 when the electronic device 101 is connected to the external electronic device 102 through the connector 203, determine whether the identification information matches comparison data stored in the memory 130, determine whether a voltage of a power terminal VBUS among the one or more signal terminals satisfies a specified condition when the identification information matches the comparison data, and transmit power determined based on a real-time voltage of the battery 189 to the external electronic device 102 by using the second path through the connector 203 based on whether the specified condition is satisfied.

According to an embodiment, the comparison data may include information on a type of the external electronic device 102 capable of receiving the power determined corresponding to the real-time voltage.

According to an embodiment, the instructions may cause the processor 120 to boost the real-time voltage by using the first converter 310 when the identification information does not match the comparison data, and transmit power determined based on the boosted voltage to the external electronic device 102 by using the first path through the connector 203.

According to an embodiment, the instructions may cause the processor 120 to adjust a level of the boosted voltage by using the first converter 310 when the first path is used, and adjust a switching frequency of at least one transistor included in the first converter 310.

According to an embodiment, the instructions may cause the processor 120 to recognize USB ID and BCD device information as the identification information when the electronic device 101 and the external electronic device 102 perform data communication, and recognize a vendor defined message (VDM) as the identification information when the electronic device 101 and the external electronic device 102 perform power delivery (PD) communication.

According to an embodiment, the instructions may cause the processor 120 to, when the identification information and the comparison data match, determine whether a charge state of the battery 189, a current of the electronic device 101, and a current of the external electronic device 102 each satisfy the specified condition, wherein the current of the electronic device 101 includes a consumption current of the processor 120, and wherein the current of the external electronic device 102 includes a driving current of the external electronic device 102.

According to an embodiment, the instructions may cause the processor 120 to transmit power determined based on boosted voltage to the external electronic device 102 by using the first path through the connector 203 when it is determined that at least one of the charge state of the battery 189, the voltage of the power terminal, the current of the electronic device 101, or the current of the external electronic device 102 does not satisfy the specified condition, and transmit power determined based on the real-time voltage of the battery 189 to the external electronic device by using the second path through the connector 203 when it is determined that the charge state of the battery 189, the voltage of the power terminal, the current of the electronic device 101, and the current of the external electronic device 102 each satisfy the specified condition.

According to an embodiment, the instructions may cause the processor 120 to determine that the specified condition is satisfied when the voltage of the power terminal is equal to or greater than a first threshold value.

According to an embodiment, the instructions may cause the processor 120 to determine that the specified condition is satisfied when the charge state of the battery 189 is equal to or greater than a second threshold value.

According to an embodiment, the instructions may cause the processor 120 to determine that the specified condition is satisfied when the consumption current of the processor 120 is less than a third threshold value.

According to an embodiment, the instructions may cause the processor 120 to determine that the specified condition is satisfied when the driving current of the external electronic device 102 exceeds a fourth threshold value.

According to an embodiment, a method of controlling a voltage of the electronic device 101 may include obtaining identification information of the external electronic device 102 through the connector 203, determining whether the identification information matches comparison data stored in the electronic device 101, determining whether a voltage of the power terminal VBUS of the electronic device 101 satisfies a specified condition when the identification information matches the comparison data, and transmitting power determined based on a real-time voltage of the battery 189 to the external electronic device 102 by using a second path through the connector 203, wherein the second path is distinct from a first path, based on whether the specified condition is satisfied.

According to an embodiment, According to an embodiment, the comparison data may include information on a type of the external electronic device 102 capable of receiving the power determined based on the real-time voltage.

According to an embodiment, the method may further include boosting the real-time voltage by using the first converter 310 included in the first path when the identification information does not match the comparison data, and transmitting power determined based on the boosted voltage to the external electronic device 102 by using the first path through the connector 203.

According to an embodiment, the method may further include adjusting a level of the boosted voltage by using the first converter 310 when the first path is used, and adjusting a switching frequency of at least one transistor included in the first converter 310.

According to an embodiment, the method may further include determining whether at least one of a charge state of the battery 189, a current of the electronic device 101, and a current of the external electronic device 102 satisfies the specified condition when the identification information and the comparison data match, wherein the current of the electronic device 101 includes a consumption current of the processor 120, and wherein the current of the external electronic device 102 includes a driving current of the external electronic device 102.

According to an embodiment, the method may further include transmitting power determined based on the boosted voltage to the external electronic device 102 by using the first path through the connector 203 when it is determined that at least one of the charge state of the battery 189, the voltage of the power terminal VBUS, the current of the electronic device 101, or the current of the external electronic device 102 does not satisfy the specified condition, and transmitting power determined based on the real-time voltage of the battery 189 to the external electronic device 102 by using the second path through the connector 203 when it is determined that the charge state of the battery 189, the voltage of the power terminal VBUS, the current of the electronic device 101, and the current of the external electronic device 102 each satisfy the specified condition.

According to an embodiment, the method may further include determining that the specified condition is satisfied when the voltage of the power terminal VBUS is equal to or greater than a first threshold value, determining that the specified condition is satisfied when the charge state of the battery 189 is equal to or greater than a second threshold value, determining that the specified condition is satisfied when the consumption current of the processor 120 is less than a third threshold value, or determining that the specified condition is satisfied when the driving current of the external electronic device 102 exceeds a fourth threshold value. The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a battery;
a memory;
a connector including one or more signal terminals;
a first converter included in a first path that connects the battery to the connector, wherein the first converter is configured to provide power to the connector based on boosting an output voltage of the battery;
a second converter included in second path that is distinct from the first path and connects the battery to the connector, wherein the second converter is configured to provide power to the connector based on bypassing the output voltage of the battery; and
a processor operatively connected to the battery, the memory, the connector, the first converter, and the second converter,
wherein the memory stores instructions that, when executed, cause the processor to:
obtain identification information of an external electronic device when the electronic device is connected to the external electronic device through the connector,
determine whether the identification information matches comparison data stored in the memory,
when the identification information matches the comparison data, transmitting power through the connector to the external electronic device, using a selected one of the first converter and the first path, or the second converter and the second path, based at least in part on a charge state of the battery; and when the identification information does not match the comparison data, transmit power through the connector to the external electronic device using the first converter and the first path regardless of the charge state of the battery.

2. The electronic device of claim 1, wherein the comparison data includes information about a type of the external electronic device capable of receiving the power determined based on the output voltage.

3. The electronic device of claim 1, wherein the instructions cause the processor to:
boost the output voltage by using the first converter when the identification information does not match the comparison data, and transmit power determined based on the boosted voltage to the external electronic device by using the first path through the connector.

4. The electronic device of claim 3, wherein the instructions cause the processor to:
adjust a level of the boosted voltage by using the first converter when the first path is used, and
adjust a switching frequency of at least one transistor included in the first converter.

5. The electronic device of claim 1, wherein the instructions cause the processor to:
recognize USB ID and BCD device information as the identification information when the electronic device and the external electronic device perform data communication, and
recognize a vendor defined message (VDM) as the identification information when the electronic device and the external electronic device perform power delivery (PD) communication.

6. The electronic device of claim 1, wherein the instructions cause the processor to:
when the identification information and the comparison data match,
determine whether the charge state of the battery, a current of the electronic device, and a current of the external electronic device each satisfy a specified condition,
wherein the current of the electronic device includes a consumption current of the processor, and
wherein the current of the external electronic device includes a driving current of the external electronic device.

7. The electronic device of claim 6, wherein the instructions cause the processor to:
transmit power determined based on boosted voltage to the external electronic device by using the first path through the connector when it is determined that at least one of the charge state of the battery, a voltage of a power terminal, the current of the electronic device, or the current of the external electronic device does not satisfy the specified condition, and
transmit power determined based on the output voltage to the external electronic device by using the second path through the connector when it is determined that the charge state of the battery, the voltage of the power terminal, the current of the electronic device, and the current of the external electronic device each satisfy the specified condition.

8. The electronic device of claim 7, wherein the instructions cause the processor to:
determine that the specified condition is satisfied based at least in part on the voltage of the power terminal equal to or greater than a first threshold value.

9. The electronic device of claim 7, wherein the instructions cause the processor to:

determine that the specified condition is satisfied based at least in part on the charge state of the battery equal to or greater than a second threshold value.

10. The electronic device of claim 7, wherein the instructions cause the processor to:

determine that the specified condition is satisfied based at least in part on the consumption current of the processor less than a third threshold value.

11. The electronic device of claim 7, wherein the instructions cause the processor to:

determine that the specified condition is satisfied based at least in part on the driving current of the external electronic device exceeding a fourth threshold value.

12. A method of controlling a voltage of an electronic device, the method comprising:

obtaining identification information of an external electronic device through a connector;

determining whether the identification information matches comparison data stored in the electronic device;

determining whether a voltage of a power terminal of the electronic device satisfies a specified condition when the identification information matches the comparison data; and when the identification information matches the comparison data, transmitting power determined based on an output voltage of a battery to the external electronic device, using a selected one of a first converter and a first path, or a second converter and a second path through the connector, based at least in part on a charge state of the battery, when the identification information does not match the comparison data, transmitting power through the connector to the external electronic device using the first converter and the first path regardless of the charge state of the battery, wherein the first converter is configured to provide power to the connector based on boosting the output voltage of the battery and the second converter is configured to provide power to the connector based on bypassing the output voltage of the battery.

13. The method of claim 12, wherein the comparison data includes information about a type of the external electronic device capable of receiving the power determined based on the output voltage.

14. The method of claim 12, further comprising:

boosting the output voltage by using a first converter included in the first path when the identification information does not match the comparison data, and transmitting power determined based on the boosted voltage to the external electronic device by using the first path through the connector.

15. The method of claim 14, further comprising:

adjusting a level of the boosted voltage by using the first converter when the first path is used; and adjusting a switching frequency of at least one transistor included in the first converter.

16. The method of claim 12, further comprising:

determining whether at least one of the charge state of the battery, a current of the electronic device, and a current of the external electronic device satisfies a specified condition when the identification information and the comparison data match, wherein the current of the electronic device includes a consumption current of a processor, and wherein the current of the external electronic device includes a driving current of the external electronic device.

17. The method of claim 16, further comprising:

transmitting power determined based on boosted voltage to the external electronic device by using the first path through the connector when it is determined that at least one of the charge state of the battery, the voltage of the power terminal, the current of the electronic device, or the current of the external electronic device does not satisfy the specified condition; and transmitting power determined based on the output voltage of the battery to the external electronic device by using the second path through the connector when it is determined that the charge state of the battery, the voltage of the power terminal, the current of the electronic device, and the current of the external electronic device each satisfy the specified condition.

18. The method of claim 16, further comprising:

determining that the specified condition is satisfied when the voltage of the power terminal is equal to or greater than a first threshold value;

determining that the specified condition is satisfied when the charge state of the battery is equal to or greater than a second threshold value;

determining that the specified condition is satisfied when the consumption current of the processor is less than a third threshold value, or determining that the specified condition is satisfied when the driving current of the external electronic device exceeds a fourth threshold value.

19. The method of claim 14, wherein the first converter comprises an inductor, the method further comprising:

during a first period, building an electromagnetic force across the inductor; and during a second period, transmitting power based on voltage from the inductor and the battery to the external electronic device.

20. The method of claim 19, wherein the first converter comprises a first transistor and a second transistor, the method further comprising:

turning off the first transistor and turning on the second transistor during the first period; and turning on the first transistor and turning off the second transistor during the second period.

* * * * *